(12) United States Patent
Sidhu et al.

(10) Patent No.: US 10,184,798 B2
(45) Date of Patent: Jan. 22, 2019

(54) MULTI-STAGE DEAD RECKONING FOR CROWD SOURCING

(75) Inventors: Gursharan S. Sidhu, Seattle, WA (US); Sharad Agarwal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 848 days.

(21) Appl. No.: 13/284,128

(22) Filed: Oct. 28, 2011

(65) Prior Publication Data
US 2013/0110454 A1 May 2, 2013

(51) Int. Cl.
*G01C 21/16* (2006.01)

(52) U.S. Cl.
CPC .................... *G01C 21/16* (2013.01)

(58) Field of Classification Search
CPC ........................................... G06F 15/00
USPC .......................................... 702/150
See application file for complete search history.

(56) References Cited

U.S. PATENT DOCUMENTS

| | | |
|---|---|---|
| 4,357,593 A | 11/1982 | von Tomkewitsch |
| 4,796,191 A | 1/1989 | Honey et al. |
| 4,949,268 A | 8/1990 | Nishikawa et al. |
| 5,493,692 A | 2/1996 | Theimer et al. |
| 5,544,321 A | 8/1996 | Theimer et al. |
| 5,555,376 A | 8/1996 | Theimer et al. |
| 5,564,079 A | 10/1996 | Olsson |
| 5,592,173 A | 1/1997 | Lau et al. |
| 5,603,054 A | 2/1997 | Theimer et al. |
| 5,611,050 A | 3/1997 | Theimer et al. |
| 5,623,184 A | 4/1997 | Boll et al. |
| 5,623,194 A | 4/1997 | Boll et al. |
| 5,812,865 A | 9/1998 | Theimer et al. |
| 5,842,130 A | 11/1998 | Oprescu-Surcobe |
| 5,845,227 A | 12/1998 | Peterson |
| 5,943,621 A | 8/1999 | Ho et al. |
| 5,948,040 A | 9/1999 | DeLorme et al. |
| 5,978,732 A | 11/1999 | Kakitani et al. |

(Continued)

FOREIGN PATENT DOCUMENTS

| CN | 1375999 A | 10/2002 |
|---|---|---|
| CN | 1488955 A | 4/2004 |

(Continued)

OTHER PUBLICATIONS

Arvind Thiagarajan, et al (Cooperative Transit Tracking using Smart-phones, Nov. 3-5, 2010).*

(Continued)

*Primary Examiner* — Mischita Henson
(74) *Attorney, Agent, or Firm* — Rainier Patents, P.S.

(57) ABSTRACT

A device identifies signals it receives at a particular point in time, such as Wi-Fi signals and cell tower signals. The device records data indicating these identified signals, as well as data used to determine the position of the device at that particular point in time. The position of the device is determined using dead reckoning, which is separated into two stages. In the first stage, a distance and direction of movement is determined at the device based on data from various inertial sensors of the device. In the second stage, various filters, maps, and/or other techniques are used at another device (e.g., a crowd sourcing data service) thus alleviating the device of the burden of performing the second stage.

20 Claims, 6 Drawing Sheets

(56) References Cited

U.S. PATENT DOCUMENTS

| | | |
|---|---|---|
| 6,052,598 A | 4/2000 | Rudrapatna et al. |
| 6,116,363 A | 9/2000 | Frank |
| 6,122,572 A | 9/2000 | Yavnai |
| 6,175,805 B1 | 1/2001 | Abe |
| 6,292,687 B1 | 9/2001 | Lowell et al. |
| 6,313,786 B1 | 11/2001 | Sheynblat et al. |
| 6,314,347 B1 | 11/2001 | Kuroda et al. |
| 6,323,807 B1 | 11/2001 | Golding et al. |
| 6,353,398 B1 | 3/2002 | Amin et al. |
| 6,381,522 B1 | 4/2002 | Watanabe et al. |
| 6,418,424 B1 | 7/2002 | Hoftberg et al. |
| 6,466,232 B1 | 10/2002 | Newell et al. |
| 6,480,783 B1 | 11/2002 | Myr |
| 6,490,519 B1 | 12/2002 | Lapidot et al. |
| 6,513,046 B1 | 1/2003 | Abbott, III et al. |
| 6,522,266 B1 | 2/2003 | Soehren et al. |
| 6,549,915 B2 | 4/2003 | Abbott, III et al. |
| 6,574,351 B1 | 6/2003 | Miyano |
| 6,577,946 B2 | 6/2003 | Myr |
| 6,615,130 B2 | 9/2003 | Myr |
| 6,668,227 B2 | 12/2003 | Hamada et al. |
| 6,672,506 B2 | 1/2004 | Swart et al. |
| 6,678,525 B1 | 1/2004 | Baranger et al. |
| 6,721,572 B1 | 4/2004 | Smith et al. |
| 6,741,188 B1 | 5/2004 | Miller et al. |
| 6,747,675 B1 | 6/2004 | Abbott et al. |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,807,483 B1 | 10/2004 | Chao et al. |
| 6,812,937 B1 | 11/2004 | Abbott et al. |
| 6,837,436 B2 | 1/2005 | Swartz et al. |
| 6,842,877 B2 | 1/2005 | Robarts et al. |
| RE38,724 E | 4/2005 | Peterson |
| 6,889,382 B1 | 5/2005 | Anderson |
| 6,925,378 B2 * | 8/2005 | Tzamaloukas ................ 701/428 |
| 6,992,625 B1 | 1/2006 | Krumm et al. |
| 7,010,501 B1 | 3/2006 | Roslak et al. |
| 7,040,541 B2 | 5/2006 | Swartz et al. |
| 7,054,938 B2 | 5/2006 | Sundqvist et al. |
| 7,058,506 B2 | 6/2006 | Kawase et al. |
| 7,063,263 B2 | 6/2006 | Swartz et al. |
| 7,084,762 B2 | 8/2006 | Pedrazzini et al. |
| 7,116,987 B2 | 10/2006 | Spain, Jr. et al. |
| 7,116,988 B2 | 10/2006 | Dietrich et al. |
| 7,127,213 B2 | 10/2006 | Haymes et al. |
| 7,130,743 B2 | 10/2006 | Kudo et al. |
| 7,162,367 B2 | 1/2007 | Lin et al. |
| 7,171,378 B2 | 1/2007 | Petrovich et al. |
| 7,188,025 B2 | 3/2007 | Hudson, Jr. |
| 7,195,157 B2 | 3/2007 | Swartz et al. |
| 7,200,394 B2 | 4/2007 | Aoki et al. |
| 7,215,969 B2 | 5/2007 | Benco et al. |
| 7,233,861 B2 | 6/2007 | Van Buer et al. |
| 7,250,907 B2 | 7/2007 | Krumm et al. |
| 7,385,501 B2 | 6/2008 | Miller et al. |
| 7,392,134 B2 | 6/2008 | Tauchi et al. |
| 7,433,696 B2 | 10/2008 | Dietrich et al. |
| 7,463,890 B2 | 12/2008 | Herz et al. |
| 7,512,462 B2 | 3/2009 | Nichols et al. |
| 7,590,589 B2 | 9/2009 | Hoffberg |
| 7,617,042 B2 | 11/2009 | Horvitz et al. |
| 7,630,986 B1 | 12/2009 | Herz et al. |
| 7,636,707 B2 | 12/2009 | Chaudhuri et al. |
| 7,698,055 B2 | 4/2010 | Horvitz et al. |
| 7,705,728 B2 | 4/2010 | Mock et al. |
| 7,706,964 B2 | 4/2010 | Horvitz |
| 7,739,040 B2 | 6/2010 | Horvitz |
| 7,778,440 B2 * | 8/2010 | Malone ................ 382/100 |
| 7,796,966 B2 | 9/2010 | Bhattacharya et al. |
| 7,813,870 B2 | 10/2010 | Downs et al. |
| 7,856,234 B2 | 12/2010 | Alizadeh-Shabdiz et al. |
| 7,864,048 B1 | 1/2011 | Cope et al. |
| 7,873,368 B2 | 1/2011 | Goren |
| 7,899,611 B2 | 3/2011 | Downs et al. |
| 7,912,628 B2 | 3/2011 | Chapman et al. |
| 7,925,426 B2 | 4/2011 | Koebler et al. |
| 7,991,718 B2 | 8/2011 | Horvitz et al. |
| 8,024,112 B2 | 9/2011 | Krumm et al. |
| 8,090,530 B2 | 1/2012 | Horvitz |
| 8,126,641 B2 | 2/2012 | Horvitz |
| 8,155,872 B2 | 4/2012 | Kjeldsen et al. |
| 8,165,773 B1 | 4/2012 | Chavez et al. |
| 8,174,447 B2 | 5/2012 | Loidl et al. |
| 8,180,366 B2 | 5/2012 | Ernst et al. |
| 8,190,362 B2 | 5/2012 | Barker et al. |
| 8,255,275 B2 | 8/2012 | Collopy et al. |
| 8,260,481 B2 | 9/2012 | Naik et al. |
| 8,320,939 B1 * | 11/2012 | Vincent ................ 455/456.1 |
| 8,433,512 B1 | 4/2013 | Lopatenko et al. |
| 8,443,662 B2 * | 5/2013 | Lane et al. ................ 73/178 R |
| 8,463,545 B2 | 6/2013 | Boore et al. |
| 8,484,113 B2 | 7/2013 | Collopy et al. |
| 8,519,860 B2 | 8/2013 | Johnson et al. |
| 8,532,670 B2 | 9/2013 | Kim et al. |
| 8,538,686 B2 | 9/2013 | Gruen et al. |
| 8,560,218 B1 * | 10/2013 | Kahn et al. ................ 701/472 |
| 8,566,029 B1 | 10/2013 | Lopatenko et al. |
| 8,566,783 B2 | 10/2013 | Yang et al. |
| 8,589,065 B2 | 11/2013 | Scofield et al. |
| 8,620,692 B2 | 12/2013 | Collopy et al. |
| 8,712,931 B1 | 4/2014 | Wahlen |
| 8,751,146 B2 | 6/2014 | Shrivathsan et al. |
| 8,762,053 B1 | 6/2014 | Lehman |
| 8,788,606 B2 | 7/2014 | Johnson et al. |
| 8,825,381 B2 | 9/2014 | Tang |
| 8,898,002 B2 | 11/2014 | Barrett |
| 8,981,995 B2 | 3/2015 | Schlesinger et al. |
| 8,990,333 B2 | 3/2015 | Johnson et al. |
| 9,134,137 B2 | 9/2015 | Brush et al. |
| 9,310,462 B2 | 4/2016 | Chintalapudi et al. |
| 2001/0029425 A1 | 10/2001 | Myr |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0044152 A1 | 4/2002 | Abbott, III et al. |
| 2002/0050944 A1 | 5/2002 | Sheynblat et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0107618 A1 | 8/2002 | Deguchi et al. |
| 2003/0036842 A1 | 2/2003 | Hancock |
| 2003/0042051 A1 | 3/2003 | Kriger |
| 2003/0046401 A1 | 3/2003 | Abbott et al. |
| 2003/0069683 A1 | 4/2003 | Lapidot et al. |
| 2003/0135304 A1 | 7/2003 | Sroub et al. |
| 2003/0139863 A1 | 7/2003 | Toda et al. |
| 2003/0140088 A1 * | 7/2003 | Robinson et al. ............ 709/202 |
| 2003/0153338 A1 | 8/2003 | Herz et al. |
| 2003/0154009 A1 | 8/2003 | Basir et al. |
| 2003/0154476 A1 | 8/2003 | Abbott, III et al. |
| 2003/0195700 A1 | 10/2003 | Hamada et al. |
| 2003/0229471 A1 | 12/2003 | Guralnik et al. |
| 2003/0229895 A1 | 12/2003 | Jasinschi et al. |
| 2004/0019603 A1 | 1/2004 | Haigh et al. |
| 2004/0068364 A1 | 4/2004 | Zhao et al. |
| 2004/0090121 A1 | 5/2004 | Simonds et al. |
| 2004/0090346 A1 | 5/2004 | Simonds et al. |
| 2004/0092253 A1 | 5/2004 | Simonds et al. |
| 2004/0093154 A1 | 5/2004 | Simonds et al. |
| 2004/0093155 A1 | 5/2004 | Simonds et al. |
| 2004/0128066 A1 | 7/2004 | Kudo et al. |

(56) References Cited

U.S. PATENT DOCUMENTS

| | | |
|---|---|---|
| 2004/0153445 A1 | 8/2004 | Horvitz et al. |
| 2004/0167667 A1* | 8/2004 | Goncalves ............ G01C 21/12 700/245 |
| 2004/0176211 A1 | 9/2004 | Kitajima et al. |
| 2004/0189475 A1 | 9/2004 | Cooper et al. |
| 2004/0201500 A1 | 10/2004 | Miller et al. |
| 2004/0230374 A1 | 11/2004 | Tzamaloukas |
| 2004/0260457 A1 | 12/2004 | Kawase et al. |
| 2004/0268403 A1 | 12/2004 | Krieger et al. |
| 2005/0021417 A1 | 1/2005 | Kassan |
| 2005/0034078 A1 | 2/2005 | Abbott et al. |
| 2005/0046584 A1 | 3/2005 | Breed |
| 2005/0048946 A1 | 3/2005 | Holland |
| 2005/0049900 A1 | 3/2005 | Hirose et al. |
| 2005/0062643 A1* | 3/2005 | Pande et al. ................ 342/357.1 |
| 2005/0068946 A1 | 3/2005 | Holland |
| 2005/0107946 A1 | 5/2005 | Shimizu et al. |
| 2005/0125148 A1 | 6/2005 | Van Buer et al. |
| 2005/0131607 A1 | 6/2005 | Breed |
| 2005/0144318 A1 | 6/2005 | Chang |
| 2005/0149253 A1 | 7/2005 | Nambata |
| 2005/0219120 A1 | 10/2005 | Chang |
| 2005/0228553 A1 | 10/2005 | Tyron |
| 2005/0261004 A1 | 11/2005 | Dietrich et al. |
| 2005/0266858 A1 | 12/2005 | Miller et al. |
| 2005/0272442 A1 | 12/2005 | Miller et al. |
| 2005/0283503 A1 | 12/2005 | Hancock et al. |
| 2005/0285793 A1 | 12/2005 | Sugar et al. |
| 2006/0019676 A1 | 1/2006 | Miller et al. |
| 2006/0022048 A1 | 2/2006 | Johnson |
| 2006/0167784 A1* | 7/2006 | Hoffberg ......................... 705/37 |
| 2006/0200310 A1 | 9/2006 | Kim et al. |
| 2006/0241862 A1 | 10/2006 | Ichihara et al. |
| 2006/0264211 A1 | 11/2006 | Kalhan et al. |
| 2006/0284765 A1 | 12/2006 | Bernhardt et al. |
| 2006/0286988 A1 | 12/2006 | Blume et al. |
| 2006/0287813 A1 | 12/2006 | Quigley |
| 2007/0008927 A1 | 1/2007 | Herz et al. |
| 2007/0073477 A1 | 3/2007 | Krumm et al. |
| 2007/0106465 A1 | 5/2007 | Adam et al. |
| 2007/0115174 A1 | 5/2007 | Herrick |
| 2007/0179792 A1 | 8/2007 | Kramer |
| 2007/0208495 A1 | 9/2007 | Chapman et al. |
| 2008/0005172 A1* | 1/2008 | Gutmann ................... 707/104.1 |
| 2008/0018529 A1 | 1/2008 | Yoshioka |
| 2008/0180637 A1 | 1/2008 | Kjeldsen et al. |
| 2008/0070593 A1 | 3/2008 | Altman et al. |
| 2008/0077326 A1 | 3/2008 | Funk |
| 2008/0090591 A1 | 4/2008 | Miller et al. |
| 2008/0091537 A1 | 4/2008 | Miller et al. |
| 2008/0129598 A1 | 6/2008 | Godefroy et al. |
| 2008/0161018 A1 | 7/2008 | Miller et al. |
| 2008/0191941 A1 | 8/2008 | Saban et al. |
| 2008/0234935 A1 | 9/2008 | Wolf et al. |
| 2008/0248815 A1 | 10/2008 | Busch |
| 2008/0249667 A1 | 10/2008 | Horvitz et al. |
| 2008/0319658 A1 | 12/2008 | Horvitz et al. |
| 2008/0319660 A1 | 12/2008 | Horvitz et al. |
| 2009/0009397 A1 | 1/2009 | Taylor |
| 2009/0043504 A1 | 2/2009 | Bandyopadhyay et al. |
| 2009/0051566 A1* | 2/2009 | Olsen et al. ............ 340/825.49 |
| 2009/0063038 A1 | 3/2009 | Shrivathsan et al. |
| 2009/0149155 A1 | 6/2009 | Grossman |
| 2009/0177437 A1 | 7/2009 | Roumeliotis |
| 2009/0184849 A1 | 7/2009 | Nasiri et al. |
| 2009/0191892 A1* | 7/2009 | Kelley ......................... 455/456.1 |
| 2009/0192709 A1 | 7/2009 | Yonker |
| 2009/0248301 A1* | 10/2009 | Judd et al. ..................... 701/213 |
| 2009/0312032 A1 | 12/2009 | Bornstein |
| 2010/0039929 A1 | 2/2010 | Cho et al. |
| 2010/0079332 A1 | 4/2010 | Garen |
| 2010/0079334 A1 | 4/2010 | Roh et al. |
| 2010/0087230 A1* | 4/2010 | Peh et al. ....................... 455/566 |
| 2010/0090899 A1 | 4/2010 | Ahao et al. |
| 2010/0097269 A1 | 4/2010 | Loidl et al. |
| 2010/0127926 A1 | 5/2010 | Wang |
| 2010/0131308 A1 | 5/2010 | Collopy et al. |
| 2010/0153007 A1 | 6/2010 | Crowley |
| 2010/0156708 A1 | 6/2010 | Chen |
| 2010/0161179 A1 | 6/2010 | McClure et al. |
| 2010/0174479 A1 | 7/2010 | Golding et al. |
| 2010/0176992 A1 | 7/2010 | T'siobbel |
| 2010/0185388 A1 | 7/2010 | Horvitz |
| 2010/0250133 A1 | 9/2010 | Buros |
| 2010/0255856 A1 | 10/2010 | Kansal et al. |
| 2010/0255858 A1 | 10/2010 | Juhasz |
| 2010/0310071 A1* | 12/2010 | Malone et al. ................ 380/247 |
| 2010/0324813 A1 | 12/2010 | Sundararajan et al. |
| 2010/0324815 A1 | 12/2010 | Hiruta et al. |
| 2010/0332125 A1 | 12/2010 | Tan et al. |
| 2011/0035142 A1 | 2/2011 | Tang |
| 2011/0039573 A1* | 2/2011 | Hardie ........................ 455/456.1 |
| 2011/0050493 A1 | 3/2011 | Torimoto et al. |
| 2011/0071759 A1 | 3/2011 | Pande et al. |
| 2011/0148623 A1* | 6/2011 | Bishop et al. ............. 340/539.13 |
| 2011/0151898 A1 | 6/2011 | Chandra et al. |
| 2011/0163914 A1 | 7/2011 | Seymour |
| 2011/0169632 A1* | 7/2011 | Walker et al. ........... 340/539.13 |
| 2011/0171024 A1 | 7/2011 | DeLuca |
| 2011/0178708 A1* | 7/2011 | Zhang et al. .................. 701/221 |
| 2011/0182238 A1 | 7/2011 | Marshall et al. |
| 2011/0184644 A1 | 7/2011 | McBurney |
| 2011/0191024 A1 | 8/2011 | DeLuca |
| 2011/0191052 A1 | 8/2011 | Lin et al. |
| 2011/0197200 A1* | 8/2011 | Huang et al. ................. 719/313 |
| 2011/0207471 A1 | 8/2011 | Murray et al. |
| 2011/0208430 A1* | 8/2011 | Tun et al. ....................... 701/216 |
| 2011/0212732 A1 | 9/2011 | Garrett et al. |
| 2011/0238289 A1 | 9/2011 | Lehmann et al. |
| 2011/0238308 A1* | 9/2011 | Miller et al. .................. 701/216 |
| 2011/0246059 A1 | 10/2011 | Tokashiki |
| 2011/0270940 A1 | 11/2011 | Johnson |
| 2011/0282571 A1 | 11/2011 | Krumm et al. |
| 2011/0291886 A1* | 12/2011 | Krieter ..................... 342/357.49 |
| 2011/0306323 A1* | 12/2011 | Do et al. ...................... 455/414.1 |
| 2012/0052873 A1* | 3/2012 | Wong ......................... 455/456.1 |
| 2012/0089322 A1 | 4/2012 | Horvitz |
| 2012/0121161 A1* | 5/2012 | Eade et al. ..................... 382/153 |
| 2012/0129546 A1 | 5/2012 | Yang et al. |
| 2012/0143495 A1 | 6/2012 | Dantu |
| 2012/0173139 A1* | 7/2012 | Judd et al. ..................... 701/466 |
| 2012/0176491 A1* | 7/2012 | Garin et al. ................... 348/113 |
| 2012/0188124 A1 | 7/2012 | Reidevall et al. |
| 2012/0203453 A1 | 8/2012 | Lundquist et al. |
| 2012/0209507 A1* | 8/2012 | Serbanescu ................... 701/410 |
| 2012/0218142 A1 | 8/2012 | Leclercq |
| 2012/0221244 A1* | 8/2012 | Georgy et al. ................ 701/472 |
| 2012/0238293 A9 | 9/2012 | Pan |
| 2012/0259541 A1* | 10/2012 | Downey et al. .............. 701/433 |
| 2012/0259666 A1 | 10/2012 | Collopy et al. |
| 2012/0290615 A1* | 11/2012 | Lamb et al. ................... 707/770 |
| 2012/0299724 A1 | 11/2012 | Kuper et al. |
| 2013/0002857 A1* | 1/2013 | Kulik ............................. 348/135 |
| 2013/0018581 A1* | 1/2013 | Sidhu ...................... G01C 21/16 701/469 |
| 2013/0018629 A1* | 1/2013 | Sidhu .................... G01C 21/165 702/150 |
| 2013/0030690 A1 | 1/2013 | Witmer |
| 2013/0035111 A1* | 2/2013 | Moeglein et al. .......... 455/456.1 |
| 2013/0095848 A1* | 4/2013 | Gold et al. ................. 455/456.1 |
| 2013/0114687 A1 | 5/2013 | Kim et al. |
| 2013/0115971 A1* | 5/2013 | Marti et al. ................ 455/456.1 |
| 2013/0116921 A1 | 5/2013 | Kasargod |
| 2013/0138314 A1 | 5/2013 | Vittala |
| 2013/0158867 A1 | 6/2013 | Sidhu et al. |
| 2013/0211711 A1 | 8/2013 | Kelly et al. |
| 2013/0252628 A1* | 9/2013 | Kuehnel ..................... H04W 4/02 455/456.1 |
| 2013/0285849 A1 | 10/2013 | Ben-Moshe |
| 2013/0297204 A1 | 11/2013 | Bartels |
| 2013/0332064 A1 | 12/2013 | Funk et al. |
| 2014/0024354 A1 | 1/2014 | Haik et al. |
| 2014/0070991 A1 | 3/2014 | Liu et al. |
| 2014/0121960 A1 | 5/2014 | Park |

(56) References Cited

U.S. PATENT DOCUMENTS

| | | | |
|---|---|---|---|
| 2014/0327547 A1 | 11/2014 | Johnson | |
| 2015/0018008 A1 | 1/2015 | Schlesinger et al. | |
| 2015/0073697 A1 | 3/2015 | Barrett et al. | |
| 2015/0198694 A1* | 7/2015 | Waters | G01S 19/48 342/451 |
| 2016/0353383 A1 | 12/2016 | Haik et al. | |

FOREIGN PATENT DOCUMENTS

| | | |
|---|---|---|
| CN | 101109808 A | 1/2008 |
| CN | 101675597 A | 3/2010 |
| DE | 10042983 A1 | 3/2002 |
| EP | 2293016 A2 | 3/2011 |
| GB | 2431261 A | 4/2007 |
| JP | 04364491 A | 12/1992 |
| JP | 2007-083678 | 3/1995 |
| JP | 2008-271277 | 10/1996 |
| JP | 10132593 A | 5/1998 |
| JP | 2011-153446 | 8/1999 |
| JP | 2002-328035 | 11/2002 |
| JP | 2004-317160 | 11/2004 |
| KR | 19970071404 | 11/1997 |
| KR | 20040033141 A | 4/2004 |
| KR | 20040050550 A | 6/2004 |
| RU | 8141 | 10/1998 |
| WO | WO 9800787 | 1/1998 |
| WO | 2009039161 A2 | 3/2009 |
| WO | 2012085876 A2 | 6/2012 |

OTHER PUBLICATIONS

Lachapelle, Gerard, "GNSS Indoor Location Technologies", Retrieved at «http://www.gmat.unsw.edu.au/wang/jgps/v3n12/v3n12p01.pdf», Journal of Global Positioning Systems, vol. 3, No. 1-2, Nov. 15, 2004, pp. 2-11.

Toledo-Moreo, et al., "Performance Aspects of Navigation Systems for GNSS-Based Road User Charging", Retrieved at «http://ants.inf.um.es/~josesanta/doc/ION_GNSS10.pdf», Proceedings of the 23rd International Technical Meeting of The Satellite Division of the Institute of Navigation (ION GNSS), Sep. 21-24, 2010, pp. 1157-1165.

Collin, et al., "Indoor positioning system using accelerometry and high accuracy heading sensors", Retrieved at «http://plan.geomatics.ucalgary.ca/papers/gps03jussic.pdf», Proceedings of the 16th International Technical Meeting of The Satellite Division of the Institute of Navigation, ION GPS/GNSS Conference (Session C3), Sep. 9-12, 2003, pp. 1-7.

Wendlandt, et al., "Continuous location and direction estimation with multiple sensors using particle filtering", Retrieved at «http://ieeexplore.ieee.org/stamp/stamp.jsp?arnumber=04042026», IEEE International Conference on Multisensor Fusion and Integration for Intelligent Systems, Sep. 2006, pp. 92-97.

Toledo-Moreo, et al., "Lane-Level Integrity Provision for Navigation and Map Matching With GNSS, Dead Reckoning, and Enhanced Maps", Retrieved at «http://ieeexplore.ieee.org/stamp/stamp.jsp?tp=&arnumber=5286855», IEEE Transactions on Intelligent Transportation Systems, vol. 11, No. 1, Mar. 2010, pp. 100-112

Chun, et al., "CloneCloud: Elastic Execution between Mobile Device and Cloud", Retrieved at «http://eurosys2011.cs.uni-salzburg.at/pdf/eurosys2011-chun.pdf», Proceedings of the sixth conference on Computer systems (EuroSys '11 ), Apr. 10-13, 2011, pp. 301-314.

Sidhu, Gursharan S., "Activating and Deactivating Sensors for Dead Reckoning", Filed Date: Jul. 14, 2011, pp. 4.

Sidhu, Gursharan S., "Crowd Sourcing Based on Dead Reckoning", Filed Date: Jul. 14, 2011, pp. 48.

Sidhu, Gursharan S., "Path Progression Matching for Indoor Positioning Systems", Filed Date: Nov. 24, 2010, pp. 43.

Cabero, Jose M., et al., "Indoor People Tracking Based on Dynamic Weighted MultiDimensional Scaling", MSWIM '07, Oct. 22-26, 2007, Chania, Crete Island, Greece, available at <http://www.ri.cmu.edu/pub_files/pub4/maria_cabero_jose_2007_1/maria_cabero_jose_2007_1.pdf>,(Oct. 22, 2007), 8 pages.

De Moraes, Luis F., et al., "Calibration-Free WLAN Location System Based on Dynamic Mapping of Signal Strength", *9th Symposium on Modeling, Analysis, and Simulation of Wireless and Mobile Systems*, Oct. 2-6, 2006, MobiWac '06, Torremolinos, Malaga, Spain, available at <http//:www.ravel.ufrj.br/arquivosPublicacoes/WAC11-demoraes.pdfs>,(Oct. 2, 2006), 8 pages.

Goyal, Vishal "MEMS Based Motion Sensing Design", Retrieved from: <http://www.eeherald.com/section/design-guide/mems_application.html> on Mar. 30, 2011,(2006), 2 pages.

Jimenez, A. R., et al., "A Comparison of Pedestrian Dead-Reckoning Algorithms using a Low-Cost MEMS IMU", *WISP 2009, 6th IEEE International Symposium on Intelligent Signal Processing*, Aug. 26-28, 2009, Budapest, Hungary, available at <http://www.iai.csic.es/users/fseco/papers/WISP2009Jimenez.pdf>,(Aug. 26, 2009),pp. 37-42.

Jin, Yunye et al., "A Robust Dead-Reckoning Pedestrian Tracking System with Low Cost Sensors", *2011 IEEE International Conference on Pervasive Computing and Communications (PerCom)*, Seattle, WA, Mar. 21-25, 2011, available at <http://www.ami-lab.org/uploads/Publications/Conference/WP2/Robust%20Dead-Reckoning%20Pedestrian%20Tracking%20System%20with%20Low%20Cost%20Sensors.pdf>,(Mar. 21, 2011), pp. 222-230.

Koyuncu, Hakan et al., "A Survey of Indoor Positioning and Object Locating Systems", *IJCSNS International Journal of Computer Science and Network Security*, vol. 10, No. 5, May 2010, available at <http://paper.ijcsns.org/07_book/201005/20100518.pdf>,(May 2010), pp. 121-128.

Paul, Anindya S., et al., "Wi-Fi Based Indoor Localization and Tracking Using Sigma-Point Kalman Filtering Methods", *IEEE/ION Position, Location and Navigation Symposium*, May 5-8, 2008, available at <http//:www.cse.ogi.edu/~anindya/Paul_Wan_Plans08.pdf>,(May 5, 2008), 14 pages.

Rogoleva, Luba "Crowdsourcing Location Information to Improve Indoor Localization", *Master Thesis*, available at <http://e-collection.ethbib.ethz.ch/eserv/eth:1224/eth-1224-01.pdf>,(Apr. 30, 2010), 91 pages.

Shin, Seung H., et al., "Sit-Down & Stand-Up Awareness Algorithm for the Pedestrian Dead Reckoning", *GNSS '09*, May 3-6, 2009, available at <http://s-space.snu.ac.kr/bitstream/10371/27736/1/Sit-Down%20&%20Stand-Up%20Awareness%20Algorithm%20for%20the%20Pedestrian%20Dead%20Reckoning.pdf>,(May 3, 2009), 6 pages.

Xuan, Yiguang et al., "Crowd Sourcing Indoor Maps with Mobile Sensors", *MUS '10*, Dec. 6-9, 2010, available at <http://www.ocf.berkeley.edu/~xuanyg/IndoorMap_Mobiquitous2010_ver2.pdf>,(Dec. 6, 2010), 12 pages.

Yang, Zongxiang "Path Progression Matching for Indoor Positioning Systems", U.S. Appl. No. 12/954,545, filed Nov. 24, 2010, 43 pages.

Zhu, et al., "Indoor/Outdoor Location of Cellular Handsets Based on Received Signal Strength", *Electronics Letters*, vol. 41, No. 1, available at <http://ieeexplore.ieee.org/stamp/stamp.jsp?amumber=01543256>,(Jan. 6, 2005), 2 pages.

"Non-Final Office Action", U.S. Appl. No. 12/954,545, (dated Jun. 15, 2012),9 pages.

Beard, K., et al., "Estimating positions and paths of moving objects", Temporal Representation and Reasoning, 2000. TIME 2000. Proceedings. Seventh International Workshop on; Digital Object Identifier: 10.1109/TIME.2000.856597 Publication Year: 2000, pp. 155-162.

Billinghurst, Mark, et al., "An Evaluation of Wearable Information Spaces", Proceedings of the Virtual Reality Annual International Symposium, 1998, 8 pages.

Billinghurst, Mark, et al., "Research Directions in Wearable Computing", University of Washington, May 1998, 48 pages.

Billinghurst, Mark, et al., "Wearable Devices: New Ways to Manage Information", IEEE Computer Society, Jan. 1999, pp. 57-64.

Chen, Guanling, et al., "A Survey of Context-Aware Mobile Computing Research," Dartmouth Computer Science Technical Report, 2000, 16 pages.

(56) References Cited

OTHER PUBLICATIONS

Choi, Jae-Hyeong, et al., "Performance evaluation of traffic control based on geographical information", Intelligent Computing and Intelligent Systems, 2009. ICIS 2009. IEEE International Conference on; vol. 3; Publication Year: 2009, pp. 85-89.
Gusenbauer, et al., "Self-Contained Indoor Positioning on Off-The-Shelf Mobile Devices", retrieved at «http:// ieeexplore.ieee.org/stamp/stamp.jsp?tp=&arnumber=05646681», International Conference on Indoor Positioning and Indoor Navigation (IPIN), Sep. 2010, 9 pages.
Harter, Andy, et al., "A Distributed Location System for the Active Office," IEEE Network, 1994, pp. 62-70.
Horvitz, Eric, et al., "Attention-Sensitive Alerting in Computing Systems", Microsoft Research, Aug. 1999.
Horvitz, Eric, et al., "In Pursuit of Effective Handsfree Decision Support: Coupling Bayesian Inference", Speech Understanding, and User Models,1995, 8 pages.
Joachims, T., "Text categorization with support vector machines: learning with many relevant features", Machine Learning, European Conference on Machine Learning, Apr. 21, 1998, pp. 137-142.
Kostov, V., et al., "Travel destination prediction using frequent crossing pattern from driving history", Intelligent transportation Systems, 2005. Proceedings. 2005 IEEE; Digital Object Identifier: 10.1109/ITSC.2005.1520182 Publication Year: 2005, pp. 343-350.
Krumm, "Predestination: Where Do You Want to Go Today?"; Computer; vol. 40, Issue 4; Apr. 2007; pp. 105-107.
Lee, Junghoon, et al., "Design and implementation of a movement history analysis frame-work for the Taxi telematics system", Communications, 2008. APCC 2008. 14$^{th}$ Asia-Pacific Conference on; Publication Year: 2008, pp. 1-4.
Liu, Feng, et al., "Remaining Delivery Time Estimation Based Routing for Intermittently Connected Mobile Networks", Distributed Computing Systems Workshops, 2008. ICDCS '08. 28$^{th}$ International Conference, Publication Year: 2008, pp. 222-227.
Losee, Robert M. Jr., "Minimizing information overload: the ranking of electronic messages", Journal of Information Science 15, Elsevier Science Publishers B.V., 1989, pp. 179-189.
Miyashita, K. et al., "A Map Matching Algorithm for Car Navigation Systems that Predict User Destination", Advanced Information Networking and Applications—Workshops, 2008. AINAW 2008. 22$^{nd}$ International Conference, Publication Year: 2008, pp. 1551-1556.
Rhodes, Bradley J., "Remembrance Agent: A continuously running automated information retrieval system", The Proceedings of The First International Conference on The Practical Application of Intelligent Agents and Multi Agent Technology,1996, pp. 487-495.
Rhodes, Bradley J., "The Wearable Remembrance Agent: A System for Augmented Memory", Personal Technologies Journal Special Issue on Wearable Computing, 1997, 12 pages.
Rhodes, Bradley J., "The Wearable Remembrance Agent: A System for Augmented Theory", The Proceedings of the First International Symposium on Wearable Computers, Oct. 1997, pp. 123-128.
Sananmongkhonchai, S. et al., "Cell-based traffic estimation from multiple GPS-equipped cars", 2009 IEEE Region 10 Conference Publication Year: 2009, pp. 1-6.
Schilit, Bill, et al., "Context-Aware Computing Applications", In Proceedings of the Workshop on Mobile Computing Systems and Applications, Dec. 1994, pp. 85-90.
Schilit, Bill, et al., "Customizing Mobile Applications", Proceedings USENIX Symposium on Mobile and Location Independent Computing, Aug. 1993, 9 pages.
Schilit, Bill, et al., "Disseminating Active Map Information to Mobile Hosts", IEEE Network, 1994 pp. 22-32, vol. 8—No. 5.
Schilit, Bill, et al., "The ParcTab Mobile Computing System", IEEE WWOS-IV, 1993, 4 pages.
Schilit, William Noah, "A System Architecture for Context-Aware Mobile Computing", Columbia University, 1995, 153 pages.
Sidhu, et al., "Multi-Stage Dead Reckoning for Crowd Sourcing," U.S. Appl. No. 13/284,128, filed Oct. 28, 2011, 42 pages.
Simmons, R, et al, "Learning to Predict Driver Route and Destination Intent", Intelligent Transportation Systems Conference, 2006. ITSC '06. IEEE; Digital Object Identifier: 10.1109/ITSC.2006.1706730 Publication Year: 2006, pp. 127-132.
Spreitzer, Mike, et al., "Providing Location Information in a Ubiquitous Computing Environment", SIGOPS '93, 1993, pp. 270-283.
Spreitzer, Mike, et al., "Architectural Considerations for Scalable, Secure, Mobile Computing with Location Information", In The 14$^{th}$ International Conference on Distributed Computing Systems, Jun. 1994, pp. 29-38.
Spreitzer, Mike, et al., "Scalable, Secure, Mobile Computing with Location Information", Communications of the ACM, Jul. 1993, 1 page, vol. 36—No. 7.
Starner, Thad Eugene, "Wearable Computing and Contextual Awareness", Massachusetts Institue of Technology, Jun. 1999, 248 pages.
Terada, T, et al., "Design of a Car Navigation System that Predicts User Destination", Mobile Data Management, 2006. MDM 2006. 7$^{th}$ International Conference on; Publication Year: 2006, pp. 145-150.
Theimer, Marvin, et al., "Operating System Issues for PDA's", in Fourth Workshop on Workstation Operating Systems, 1993, 7 pages.
Vaughan-Nichols, S.J., "Will Mobile Computing's Future Be Location, Location, Location?", Computer; vol. 42, Issue: 2 Digital Object Identifier: 10.1109/MC.2009.65; Publication Year: 2009, pp. 14-17.
Want, Roy, "Active Badges and Personal Interactive Computing Objects", IEEE Transactions on Consumer Electronics, 1992, 11 pages, vol. 38—No. 1.
Want, Roy, et al., "The Active Badge Location System", ACM Transactions on Information Systems, Jan. 1992, pp. 91-102, vol. 10—No. 1.
Wei, Chien-Hung, et al., "Development of Freeway Travel Time Forecasting Models by Integrating Different Sources of Traffic Data", IEEE Transactions on Vehicular Technology; vol. 56, Issue: 6, Part: 2; Nov. 2007, pp. 3682-3694.
Weiser, Mark, "Some Computer Science Issues in Ubiquitous Computing", Communications of the ACM, Jul. 1993, pp. 75-84, vol. 36—No. 7.
Weiser, Mark, "The Computer for the 21$^{st}$ Century", Scientific American, Sep. 1991, 8 pages.
Workshop on Wearable Computing Systems, Aug. 19-21, 1996.
Wu, Yan-Jing, et al., "A dynamic navigation scheme for vehicular ad hoc networks", Networked Computing and Advanced Information Management (NCM), 2010 Sixth International Conference on; Publication Year: 2010, pp. 231-235.
Xie, M. et al., "Development of Navigation System for Autonomous Vehicle to Meet the DARPA Urban Grand Challenge", Intelligent Transportation Systems Conference, 2007. ITSC 2007. IEEE; Sep. 30-Oct. 3, 2007, Seattle, WA, pp. 767-772.
Ye, Qian, et al, "Predict Personal Continuous Route", 2008. 11$^{th}$ International IEEE Conference on Intelligent Transportation Systems; Oct. 12-15, 2008, Beijing, China; pp. 587-592.
PCT Application Serial No. PCT/US2008/067808, International Search Report and Written Opinion dated Dec. 12, 2008; 8 pages.
PCT Application Serial No. PCT/US2006/034608, International Search Report dated Jan. 15, 2007; 2 pages.
PCT Application Serial No. PCT/US00/20685; International Search Report dated Sep. 29, 2003; 3 pages.
Russian Patent Appln. 2008112196/11; Office Action dated Jun. 8, 2010.
Biegel et al., "A Framework for Developing Mobile, Context-Aware Applications", Proceedings of the 2nd IEEE Conference on Pervasive Computing and Communication, pp. 361-365, 2004.
Bisdikian et al., "Intelligent Pervasive Middleware for Context-Based and Localized Telematics Services", ACM MobiCommerce 2002, Sep. 2002, Atlanta, USA.
Kargl et al., "Smart Reminder—Personal Assistance in a Mobile Computing Environment", Pervasive 2002, Zurich, Switzerland, Aug. 26-28, 2002.
"MEMS Based Motion Sensing Design", Retrieved at «http://www.eeherald.com/section/design-guide/mems_application.html», Retrieved Mar. 30, 2011, 2 pages.

(56) References Cited

OTHER PUBLICATIONS

Ashbrook et al., "Using GPS to Learn Significant Locations and Predict Movement Across Multiple Users", Personal and Ubiquitous Computing,7(5), 2003, pp. 275-286, 15 pages.
Chen et al., "HarpiaGrid: A Reliable Grid-based Rounding Protocol for Vehicular Ad Hoc Networks", Intelligent Transportation Systems, ITSC 2008, 11th International IEEE Conference, pp. 383-388, 6 pages.
Coyne et al., "Comparison of Differentially Corrected GPS Sources for Support of Site-Specific Management in Agriculture", Jul. 2003, Kansas State University Agricultural Experiment Station and Cooperative Extension Service, 35 pages.
Hu et al., "Simulation-Assignment-Based Travel Time Prediction Model for Traffic Corridors," Intelligent Transportation Systems, IEEE Transactions, vol. PP, Issue 99, 2012, pp. 1277-1286, 10 pages.
Hu et al., "Summary of Travel Trends", 2001 National Household Survey, Dec. 2004, U.S. Department of Transportation, U.S. Federal Highway Administration, 135 pages.
Kanoh et al., "Evaluation of GA-based Dynamic Rout Guidance for Car Navigation using Cellular Automata," Intelligent Vehicle Symposium, 2002, IEEE, vol. 1, pp. 178-183, 6 pages.
Kanoh et al., "Route Guidance with Unspecific Staging Posts using Genetic Algorithm for Car Navigation Systems," Intelligent Transportation Systems, 2000, IEEE, pp. 119-124, 6 pages.
Kanoh et al., "Knowledge Based Genetic Algorithm for Dynamic Route Selection," Knowledge-Based Intelligent Engineering Systems and Allied Technologies, 2000, Proceedings Fourth International Conference on vol. 2, pp. 616-619, 4 pages.
Krumm et al., "The Microsoft Multiperson Location Survey", Aug. 2005, Microsoft Research, 4 pages.
Lai et al., "Hierarchical Incremental Pat Planning and Situation-Dependent Optimized Dynamic Motion Planning Considering Accelerations," Systems, Man, and Cybernetics, Part B: Cybernetics, IEEE Transactions on vol. 37, Issue 6, 2007, pp. 1541-1554, 14 pages.
Marmasse et al., "A User-Centered Location Model", Personal and Ubiquitos Computing, 2002(6), pp. 318-321, 4 pages.
Patterson et al., "Opportunity Knocks: A System to Provide Dobnitive Assistance with Transportation Services", in UbiComp 2004: Ubiquitous Computing, 2004, Nottingham, UK; Springer, 18 pages.
Rish, "An Empirical Study of the Naïve Bayes Classifier", IJCAI-01 Workshop on Empirical Methods in AI, Nov. 2, 2001, 7 pages.
Vanajakshi et al., "Support Vector Machine Technique for the Short Term Prediction of Travel Time," Intelligent Vehicles Symposium, 2007 IEEE, pp. 600-605, 6 pages.
Cheng, et al., "Location Prediction Algorithms for Mobile Wireless Systems," Wireless Internet Handbook: Technologies, Standards, and Applications, 2003, CRC Press, Boca Raton, FL, pp. 245-263, 17 pages.
Hariharan, et al., "Project Lachesis: Parsing and Modeling Location Histories," Geographic Information Science: Third International Conference, GI Science 2004, Adelphi, MD, Springer-Verlag GmbH, 19 pages.
Liao, et al., "Learning and Inferring Transportation Route ins," Proceedings of the 19th National Conference on Artificial Intelligence (AAAI), 2004, San Jose, CA, 6 pages.
Gogate, et al., "Modeling Transportation Routines using Hybrid Dynamic Mixed Networks," Uncertainty in Artificial Intelligence (UAI), 2005, 8 pages.
Angermann, et al., "Software Represenation for Heterogeneous Location Data Sources Using Probability Density Functions," International Symposium on Location Based Services for Cellular Users (LOCELLUS), 2001, Munich, Germany, 10 pages.
Elfes et al., "Using Occupancy Grids for Mobile Robot Perception and Navigation," IEEE Computer, 1989, 22(6), pp. 46-57, 12 pages.
Krumm, "Predestination: Predicting Driving Destinations from Map Data," UbiComp 2006: Ubiquitous Computing 8th International Conference, 18 pages.
Krumm, John, "Real Time Destination Prediction Based on Efficient Routes," SAE Technical Paper, Paper No. 2006-01-0811, Apr. 3, 2006, 6 pages.
Karbassi et al., "Vehicle Route Prediction and Time of Arrival Estimation Techniques for Improved Transportation System Management," Proceedings of the Intelligent Vehicles Symposium, 2003, pp. 511-516, 6 pages.
Ghasemzahdeh et al., "Action Coverage Formulation for Power Optimization in Body Sensor Networks," in Proceedings of the 2008 Asia and South Pacific Design Automation Conference, Jan. 2008, IEEE Computer Society Press, pp. 446-451, 6 pages.
Notice of Allowance dated Jun. 5, 2015 from U.S. Appl. No. 13/325,065, 6 pages.
Notice of Allowance dated Dec. 31, 2014 from U.S. Appl. No. 13/325,065, 5 pages.
Notice of Allowance dated Sep. 19, 2014 from U.S. Appl. No. 13/325,065, 7 pages.
Notice of Allowance dated Jun. 4, 2014 from U.S. Appl. No. 13/325,065, 12 pages.
Response filed Jan. 23, 2014 from U.S. Appl. No. 13/325,065, 20 pages.
Non-Final Office Action dated Oct. 24, 2013 from U.S. Appl. No. 13/325,065, 31 pages.
Non-Final Office Action dated Sep. 3, 2009 from U.S. Appl. No. 11/426,540, 8 pages.
Response filed Nov. 24, 2009 to the Non-Final Office Action dated Jun. 26, 2009 from U.S. Appl. No. 11/426,540, 9 pages.
Non-Final Office Action dated Apr. 6, 2010 from U.S. Appl. No. 11/426,540, 9 pages.
Response filed Jul. 6, 2010 to the Non-Final Office Action dated Apr. 6, 2010 from U.S. Appl. No. 11/426,540, 11 pages.
Non-Final Office Action dated Oct. 14, 2010 from U.S. Appl. No. 11/426,540, 16 pages.
Response filed Jan. 25, 2011 to Action dated Oct. 14, 2010 from U.S. Appl. No. 11/426,540, 12 pages.
Notice of Allowance dated Apr. 15, 2011 from U.S. Appl. No. 11/426,540, 10 pages.
Request for Examination and Voluntary Amendment filed Sep. 2, 2011 in the Canadian Patent Application No. 2,620,587, 51 pages.
Office Action dated Mar. 20, 2009 from Chinese Patent Application No. 200680036290.9, 10 pages.
Response filed Jul. 22, 2009 to the Office Action dated Mar. 20, 2009 from Chinese Patent Application No. 200680036290.9, 71 pages.
Second Office Action dated Sep. 4, 2009 from Chinese Patent Application No. 200680036290.9, 7 pages.
Response to Second Office Action filed Nov. 4, 2009 from Chinese Patent Application No. 200680036290.9, 12 pages.
Notice of Allowance dated Jan. 22, 2010 from Chinese Patent Application No. 200680036290.9, 4 pages.
Extended European Search Report dated Jun. 14, 2012 from European Patent Application No. 06802991.7, 6 pages.
Notice of Rejection and translation dated May 31, 2011 from Japanese Patent Application No. 2008-533377, 3 pages.
Examination Report dated May 18, 2010 from New Zealand Patent Application No. 566701, 1 page.
Response filed Aug. 25, 2011 from Japanese Patent Application No. 2008-533377, 2 pages.
Notice of Allowance dated Dec. 16, 2011 from Japanese Patent Application No. 2008-533377, 6 pages.
Request for Examination and Amendment filed Aug. 26, 2011 from Korean Patent Application No. 10-2008-7007693, 22 pages.
Response filed Sep. 26, 2012 to the Office Action dated Jul. 31, 2012 from Malaysian Patent Application No. PI 20080636, 7 pages.
Notice of Allowance dated Aug. 30, 2013 from Malaysian Patent Application No. PI 20080636, 3 pages.
Response filed Apr. 29, 2010 to the Examination Report dated Oct. 12, 2009 from New Zealand Patent Application No. 566701, 17 pages.
Examination Report dated Oct. 12, 2009 from New Zealand Patent Application No. 566701, 2 pages.

(56) References Cited

OTHER PUBLICATIONS

Response filed May 24, 2010 to the Examination Report dated May 18, 2010 from New Zealand Patent Application No. 566701, 4 pages.
Notice of Acceptance dated Jun. 11, 2010 from New Zealand Patent Application No. 566701, 1 page.
Office Action dated Sep. 9, 2011 from Philippine Patent Application No. 1-2008-500513, 1 page.
Office Action dated Mar. 30, 2010 and English comments from Russian Patent Application No. 20081121996, 5 pages.
Response filed May 13, 2010 from Russian Patent Application No. 20081121996, 8 pages.
Amendment filed Apr. 9, 2009 from South African Patent Application No. 2008102681, 3 pages.
Notice of Panel Decision from Pre-Appeal Brief Review dated May 19, 2015 from U.S. Appl. No. 13/190,121, 2 pages.
Pre-Appeal Brief Request and Notice of Appeal filed Apr. 28, 2015 from U.S. Appl. No. 13/190,121, 8 pages.
Final Office Action dated Jan. 28, 2015 from U.S. Appl. No. 13/190,121, 12 pages.
Response/Amendment and Reply filed Sep. 30, 2014 from U.S. Appl. No. 13/190,121, 15 pages.
Non-Final Office Action dated Jul. 1, 2014 from U.S. Appl. No. 13/190,121, 11 pages.
Response/Amendment and Reply filed Apr. 15, 2014 from U.S. Appl. No. 13/190,121, 14 pages.
Non-Final Office Action dated Jan. 15, 2014 from U.S. Appl. No. 13/190,121, 9 pages.
Response/Amendment and Reply filed Sep. 25, 2013 from U.S. Appl. No. 13/190,121, 11 pages.
Non-Final Office Action dated Jun. 27, 2013 from U.S. Appl. No. 13/190,121, 10 pages.
Response/Amendment and Reply filed Mar. 11, 2013 from U.S. Appl. No. 13/190,121, 11 pages.
Non-Final Office Action dated Dec. 12, 2012 from U.S. Appl. No. 13/190,121, 8 pages.
Notice of Allowance dated Sep. 4, 2012 from U.S. Appl. No. 13/190,121, 8 pages.
Response/Amendment and Reply filed Apr. 19, 2012 from U.S. Appl. No. 13/190,121, 9 pages.
Non-Final Office Action dated Jan. 19, 2012 from U.S. Appl. No. 13/190,121, 8 pages.
Restriction Requirement dated Feb. 26, 2009 from U.S. Appl. No. 11/733,701, 9 pages.
Response to Restriction Requirement filed Mar. 5, 2009 from U.S. Appl. No. 11/733,701, 2 pages.
Non-Final Office Action dated Mar. 26, 2009 from U.S. Appl. No. 11/733,701, 11 pages.
Response filed Jun. 26, 2009 to the Non-Final Office Action dated Mar. 26, 2009 from U.S. Appl. No. 11/733,701, 11 pages.
Final Office Action dated Oct. 21, 2009 from U.S. Appl. No. 11/733,701, 14 pages.
Response filed Dec. 2, 2009 to the Final Office Action dated Oct. 21, 2009 from U.S. Appl. No. 11/733,701, 10 pages.
Non-Final Office Action dated Dec. 23, 2011 from U.S. Appl. No. 11/733,701, 13 pages.
Response filed Mar. 27, 2012 to the Non-Final Office Action dated Dec. 23, 2011 from U.S. Appl. No. 11/733,701, 12 pages.
Notice of Non-Compliant Amendment dated May 23, 2012 from U.S. Appl. No. 11/733,701, 2 pages.
Response filed Sep. 24, 2012 to the Non-Final Office Action dated Jun. 15, 2012 from U.S. Appl. No. 12/954,545, 13 pages.
Applicant Summary of Interview with Examiner filed Oct. 5, 2012 from U.S. Appl. No. 12/954,545, 2 pages.
Applicant Initiated Interview Summary dated Oct. 16, 2012 from U.S. Appl. No. 12/954,545, 3 pages.
Notice of Allowance dated Nov. 26, 2012 from U.S. Appl. No. 12/954,545, 9 pages.
Supplemental Amendment filed Feb. 13, 2013 from U.S. Appl. No. 12/954,545, 11 pages.
Non-Final Office Action dated Mar. 1, 2013 from U.S. Appl. No. 12/954,545, 8 pages.
Response filed Jun. 24, 2013 to the Non-Final Office Action dated Mar. 1, 2013 from U.S. Appl. No. 12/954,545, 12 pages
Notice of Allowance dated Jul. 11, 2013 from U.S. Appl. No. 12/954,545, 10 pages.
Applicant Initiated Interview Summary dated Aug. 26, 2013 from U.S. Appl. No. 12/954,545, 3 pages.
Non-Final Office Action dated May 28, 2014 from U.S. Appl. No. 13/183,124, 21 pages.
Response filed Sep. 29, 2014 to the Non-Final Office Action dated May 28, 2014 from U.S. Appl. No. 13/184,124, 13 pages.
Non-Final Office Action dated Feb. 3, 2015 from U.S. Appl. No. 13/183,124, 29 pages.
Response filed May 4, 2015 to the Non-Final Office Action dated Feb. 3, 2015 from U.S. Appl. No. 13/183,124, 16 pages.
Non-Final Rejection dated Jun. 18, 2015 from U.S. Appl. No. 13/184,050, 24 pages.
Response to Final Office Action filed Feb. 25, 2015 from U.S. Appl. No. 13/184,050, 17 pages.
Final Office Action dated Nov. 26, 2014 from U.S. Appl. No. 13/184,050, 22 pages.
Response filed Oct. 10, 2014 to the Non-Final Office Action dated Jun. 11, 2014 from U.S. Appl. No. 13/184,050, 11 pages.
Non-Final Office Action dated Jun. 11, 2014 from U.S. Appl. No. 13/183,050, 19 pages.
Official Action dated Mar. 25, 2014 Withdrawing/Vacating previous Office Action from U.S. Appl. No. 13/184,050, 2 pages.
Applicant Initiated Interview Summary dated Dec. 26, 2013 from U.S. Appl. No. 13/184,050, 3 pages.
Non-Final Office Action dated Sep. 24, 2013 from U.S. Appl. No. 13/184,050, 11 pages.
Notice of Allowance and Examiner Initiated Interview Summary dated Jul. 22, 2015 from U.S. Appl. No. 13/183,124, 17 pages.
Supplemental Notice of Allowability dated Aug. 4, 2015 from from U.S. Appl. No. 13/183,124, 2 pages.
Notice of Allowance, Office Action Appendix and Applicant-Initiated Interview Summary dated Oct. 20, 2015 from U.S. Appl. No. 13/183,050, 20 pages.
Corrected Notice of Allowability dated Oct. 22, 2015 from U.S. Appl. No. 13/325,065, 2 pages.
First Office Action dated Mar. 3, 2016 from China Patent Application No. 201380046819.5, 13 pages.
Notice of Allowance dated Mar. 14, 2016 from U.S. Appl. No. 13/183,050, 49 pages.
Notice of Allowance dated Feb. 29, 2016 from U.S. Appl. No. 13/183,124, 24 pages.
Non-Final Office Action dated Apr. 4, 2016 from U.S. Appl. No. 13/606,029, 15 pages.
Response to the Final Office Action dated Dec. 4, 2015 and After Final Consideration Pilot Program 2.0 Request filed Feb. 11, 2016 from U.S. Appl. No. 13/606,029, 11 pages.
Notice of Allowance dated Mar. 28, 2016 from U.S. Appl. No. 13/325,065, 11 pages.
Advisory Action and AFCP 2.0 Decision dated Feb. 23, 2016 from U.S. Appl. No. 13/606,029, 4 pages.
Supplemental Notice of Allowability dated Aug. 27, 2015 from from U.S. Appl. No. 13/183,124, 2 pages.
Response filed Feb. 25, 2015 to Final Office Action dated Nov. 26, 2014 from U.S. Appl. No. 13/183,050, 17 pages.
Non-Final Ofice Action dated Jun. 18, 2015 from U.S. Appl. No. 13/183,050, 24 pages.
Goldstone et al., "Group Path Formation," IEEE Transaction on Systems, Man and Cybernetics, Part A: Systems Humans, 2006, vol. 36, Issue 3, pp. 611-620, 10 pages.
Samaan et al., "A User Centric Mobility Prediction Approach Based on Spatial Conceptual Maps," 2005 IEEE International Conference on Communications, vol. 2, pp. 1413-1417, 5 pages.
Notice of Allowance dated Sep. 10, 2015 from U.S. Appl. No. 13/325,065, 6 pages.
Non-Final Office Action dated Sep. 8, 2015 from U.S. Appl. No. 13/190,121, 12 pages.

(56) References Cited

OTHER PUBLICATIONS

Notice of Allowability dated Jun. 14, 2016 from U.S. Appl. No. 13/183,124, 10 pages.
Notice of Allowability dated Jun. 10, 2016 from U.S. Appl. No. 13/183,050, 19 pages.
Preliminary Amendment filed Jun. 15, 2016 to U.S. Appl. No. 15/181,091, 8 pages.
Notice of Allowability dated Jun. 7, 2016 from U.S. Appl. No. 13/325,065, 18 pages.
Response filed Jul. 19, 2016 to the Non-Final Office Action dated Apr. 4, 2016 from U.S. Appl. No. 13/606,029, 17 pages.
Response filed Jul. 18, 2016 to the First Office Action dated Mar. 3, 2016 from China Patent Application No. 201380046819.5, 10 pages.
Supplemental Notice of Allowability dated Aug. 10, 2016 from U.S. Appl. No. 13/183,124, 7 pages.
U.S. Appl. No. 60/721,879 titled "Predestination" filed Sep. 29, 2005 by Inventors Eric J. Horvitz and John C. Krumm, 31 pages.
International Preliminary Report on Patentability dated Apr. 10, 2008 from PCT Patent Application No. PCT/US2006/034608, 6 pages.
U.S. Appl. No. 60/910,799 titled "Learning and Reasoning to Enhance Energy Efficiency in Trasportation Systems" filed Apr. 9, 2009 by Inventors Eric J. Horvitz and John C. Krumm, 61 pages.
International Preliminary Report on Patentability dated Mar. 19, 2015 from PCT Patent Application No. PCT/US2013/058350, 7 pages.
Supplemental Notice of Allowability dated Sep. 13, 2016 from U.S. Appl. No. 13/183,124, 6 pages.
Supplemental Notice of Allowability dated Sep. 13, 2016 from U.S. Appl. No. 13/183,050, 6 pages.
Final Office Action dated Oct. 4, 2016 from U.S. Appl. No. 13/606,029, 138 pages.
Notice of Allowance dated Jan. 13, 2017 from U.S. Appl. No. 13/606,029, 23 pages.
Groves, Paul D., "Shadow Matching: A New GNSS Positioning Thecnique for Urban Canyons", The Journal of Navigation, 2011, vol. 64, pp. 417-430, 14 pages.
Youssef et al., "The Horus WLAN Location Determination System", 3rd International Conference on Mobile Systems, Applications and Services, Jun. 6, 2005, pp. 205-218, 14 pages.
Zheng et al., "HIPS: A Calibration-less Hybrid Indoor Positioning System Using Heterogeneous Sensors", PerCom 2009, IEEE International Conference on Pervasive Computing and Communications, Mar. 9, 2009, pp. 1-6, 6 pages.
Request for Examination and Voluntary Amendment filed Sep. 6, 2016 from Japanese Patent Application No. 2015-531214, 11 pages.
Non-Final Office Action dated May 11, 2015 from U.S. Appl. No. 13/606,008, 24 pages.
Response filed Nov. 11, 2015 to the Non-Final Office Action dated May 11, 2015 from U.S. Appl. No. 13/606,008, 13 pages.
Notice of Allowance and Examiner-Initiated Interview Summary dated Dec. 9, 2015 from U.S. Appl. No. 13/606,008, 19 pages.
Second Office Action dated Nov. 3, 2016 from Chinese Patent Application No. 201380046819.5, 10 pages.
Response filed Jan. 17, 2017 to the Second Office Action dated Nov. 3, 2016 from Chinese Patent Application No. 201380046819.5, 12 pages.
"Time Domain", captured by the Internet archive at «http://web.archive.org/web/20111026011954/http://www.timedomain.com/» on Oct. 26, 2011, 2 pages.
Alzantot et al., "IPS: Ubiquitous Indoor Positioning System", retrieved at «http://wrc.ejust.edu.eg/IPS.html» on Apr. 17, 2012, pp. 1-3, 3 pages.
Bahl et al., "RADAR: An In-Building RF-based User Location and Tracking System", IEEE Infocom 2000 Conference on Computer Communications, Nineteenth Annual Joint Conference of the IEEE Computer and Communications Societies, vol. 2, Mar. 2000, pp. 775-784, 10 pages.

Balas, Ciprian-Mihai, "Indoor Localization of Mobile Devices for a Wireless Monitoring System Based on Crowdsourcing", Master of Science, Computer Science, School of Informatics, University of Edinburgh, 2011, 78 pages.
Bauer et al., "Using Wireless Physical Layer Information to Construct Implicit Identifiers", Hot Topics in Privacy Enhancing Technologies, Jul. 2008, pp. 1-15, 15 pages.
Beauregard et al., "Pedestrian Dead Reckoning: A Basis for Personal Positioning", 3rd Workshop on Positioning, Navigation and Communication, Mar. 16, 2006, pp. 27-36, 10 pages.
Brik et al., "Wireless Device Identification with Radiometric Signatures", 14th ACM International Conference on Mobile Computing and networking, Sep. 14-19, 2008, pp. 1-13, 13 pages.
Bulusu et al., "GPS-less Low Cost Outdoor Localization for Very Small Devices", IEEE Personal Communications, vol. 7, Issue 5, Oct. 2000, pp. 28-34, 7 pages.
Chintalapudi et al., "Indoor Localization Without the Pain", Sixteenth Annual International Conference on Mobile Computing and Networking, Sep. 20-24, 2010, pp. 173-184, 12 pages.
Fox et al., "Monte Carlo Localization: Efficient Position Estimation for Mobile Robots", Sixteenth National Conference on Artificial Intelligence, Jul. 1999, pp. 343-349, 7 pages.
Goswami et al., "WiGEM: A Learning-Based Approach for Indoor Localization", Seventh Conference on Emerging Networking Experiments and Technologies, Dec. 6-9, 2011, pp. 1-12, 12 pages.
Kim et al., "A Step, Stride and Heading Determination for the Pedestrian Navigation System", Journal of Global Positioning Systems, vol. 3, Issue 1-2, Dec. 6, 2004, pp. 273-279, 7 pages.
Krumm et al., "Minimizing Calibration Effort for an Indoor 802.11 Device Location Measurement System", retrieved at «http://research.microsoft.com/pubs/68919/tr-2003-82.pdf», Microsoft Research, Tech. Report. MSR-TR-2003-82, Nov. 13, 2003, pp. 1-9, 9 pages.
Lee et al., "Crowdsourced Radiomap for Room-Level Place Recognition in Urban Environment", 8th IEEE International Conference on Pervasive Computing and Communications Workshops (PERCOM Workshops), Mar. 29, 2010, pp. 648-653, 6 pages.
Leonard et al., "Simultaneous Map Building and Localization for an Autonomous Mobile Robot", International Workshop on Intelligent Robots and Systems, Nov. 3-5, 1991, pp. 1442-1447, 6 pages.
Padmanabhan, Venkat, "The Quest for Zero-Effort Indoor Localization", retrieved at «http://www.pdl.cmu.edu/SDI/2012/043012.html» on Apr. 17, 2012, 1 page.
Robertson et al., "Simultaneous Localization and Mapping for Pedestrians using only Foot-Mounted Inertial Sensors", 11th International Conference on Ubiquitous Computing, Sep. 30-Oct. 3, 2009, pp. 93-96, 4 pages.
Sen et al., "Precise Indoor Localization using PHY Layer Information", 9th International Conference on Mobile Systems, Applications and Services, Nov. 14-15, 2011, pp. 1-6, 6 pages.
Sen et al., "SpinLoc: Spin Once to Know Your Location", 13th Workshop on Mobile Computing Systems & Applications, Feb. 28-29, 2012, pp. 1-6, 6 pages.
Smith et al., "On the Representation and Estimation of Spatial Uncertainty", International Journal of Robotics Research, vol. 5, No. 4, May 1986, pp. 56-68, 13 pages.
Xiong et al., "ArrayTrack: A Fine-Grained Indoor Location System", 13th International Workshop on Mobile Computing System and Applications, Feb. 28, 2012, pp. 1-6, 6 pages.
Corrected Notice of Allowability dated Feb. 14, 2017 from U.S. Appl. No. 13/606,029, 6 pages.
Search Report dated Jan. 15, 2007 from PCT Patent Application No. PCT/US2006/034608, 2 pages.
Applicant-Initiated Interview Summary dated Dec. 7, 2016 from U.S. Appl. No. 13/606,029, 4 pages.
Response filed Dec. 12, 2016 to the Final Office Action dated Oct. 4, 2016 from U.S. Appl. No. 13/606,029, 12 pages.
Corrected Notice of Allowability dated Mar. 14, 2017 from U.S. Appl. No. 13/606,029, 6 pages.
Supplemental Notice of Allowability dated Apr. 17, 2017 from U.S. Appl. No. 13/606,029, 6 pages.
Third Office Action dated May 2, 2017 from Chinese Patent Application No. 201380046819.5, 9 pages.

(56) References Cited

OTHER PUBLICATIONS

Preliminary Amendment filed Mar. 24, 2017 from U.S. Appl. No. 15/233,699, 8 pages.
Chang et al., "Progressive Lane Analysis in the Digital Map using Fuzzy Method," Department of Computer Science and Engineering Tatung University, 2006, 4 pages.
Chen et al., "Modeling Route Choice Behavior from Smart-phone GPS Data," Transport and Mobility Laboratory, Ecole Polytechnique Federale de Lausanne, Nov. 5, 2009, pp. 1-12, 12 pages.
Jeong et al., "TBD: Trajectory-Based Data Forwarding for Light-Traffic Vehicular Networks," 29th IEEE International Conference on Distributed Computing Systems, Jun. 22-26, 2009, pp. 231-238, 8 pages.
Martin et al., "Dynamic GPS-Position Correction for Mobile Pedestrian Navigation and Orientation," Proceedings of the 3rd Workshop on Positioning, Navigation and Communication, 2006, pp. 199-208, 10 pages.
Renso et al., "Wireless Network Data Sources: Tracking and Synthesizing Trajectories," retrieved at «http://www.dsc.ufcg.edu.br/~sampaio/Livros/mobility-data-mining-and-privacy-geographic-knowledge-discover.pdf190 page=84», 2008, pp. 73-99, 28 pages.
Scott et al., "Increased Accuracy of Motor Vehicle Position Estimation by Utilising Map Data, Vehicle Dynamics, and Other Information Sources," IEEE Vehicle Navigation and Information Systems Conference Proceedings, 1994, pp. 585-590, 6 pages.
Skog et al., "In-Car Positioning and Navigation Technologies—a Survey," IEEE Transactions on Intelligent Transportation Systems, vol. 10, No. 1, Mar. 2009, pp. 4-21, 18 pages.
Subramanian et al., "Drive-by Localization of Roadside WiFi Networks," IEEE Infocom Conference, Apr. 13-18, 2008, pp. 718-725, 9 pages.
Response filed Dec. 8, 2015 to the Non-Final Office Action dated Sep. 8, 2015 from U.S. Appl. No. 13/190,121, 15 pages.
Notice of Allowance dated Nov. 16, 2015 from U.S. Appl. No. 13/183,124, 8 pages.
Notice of Allowance dated Dec. 17, 2015 from U.S. Appl. No. 13/325,065, 18 pages.
Preliminary Amendment filed Aug. 23, 2013 from U.S. Appl. No. 13/606,029, 8 pages.
Restriction Requirement dated Jun. 25, 2015 from U.S. Appl. No. 13/606,029, 6 pages.
Response filed Jul. 21, 2015 to Restriction Requirement dated Jun. 25, 2015 from U.S. Appl. No. 13/606,029, 8 pages.
Non-Final Office Action dated Aug. 7, 2015 from U.S. Appl. No. 13/606,029, 16 pages.
Applicant-Initiated Interview Summary dated Nov. 17, 2015 from U.S. Appl. No. 13/606,029, 3 pages.
Response filed Nov. 17, 2015 to Non-Final Office Action dated Aug. 7, 2015 from U.S. Appl. No. 13/606,029, 14 pages.
Final Office Action dated Dec. 4, 2015 from U.S. Appl. No. 13/606,029, 6 pages.
International Search Report and Written Opinion dated Dec. 20, 2013 from PCt Patent Application No. PCT/US2013/058350, 10 pages.
Non-Final Office Action dated Jun. 6, 2013 from U.S. Appl. No. 13/117,171, 16 pages.
Response filed Oct. 28, 2013 to Non-Final Office Action dated Jun. 6, 2013 from U.S. Appl. No. 13/117,171, 8 pages.
Final Office Action dated Dec. 6, 2013 from U.S. Appl. No. 13/117,171, 12 pages.

\* cited by examiner

MULTI-STAGE DEAD RECKONING FOR CROWD SOURCING

BACKGROUND

As cellular phones have become more commonplace and powerful, the desire for certain applications to provide location-based functionality on these phones has increased. In order to provide such location-based functionality, the position of the phone needs to be known. Various calculations can be performed on the phone to determine the location of the phone, but performing such calculations can involve significant processing power. This can result in increased power consumption and battery drain on the phone, creating a frustrating user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, data from one or more inertial sensors is collected at a device to determine a position of the device using dead reckoning. At the device, a first stage of the dead reckoning based on the data from the one or more inertial sensors is performed. A result of the first stage is provided to an additional device (e.g., of a crowd sourcing data service) to perform a second stage of the dead reckoning based on the result of the first stage.

In accordance with one or more aspects, a result from a first stage of dead reckoning is received from a first device, the result being based on data from one or more inertial sensors of the first device. At a second device that receives the result, a second stage of the dead reckoning is performed based on the result from the first stage.

BRIEF DESCRIPTION OF THE DRAWINGS

The same numbers are used throughout the drawings to reference like features.

DETAILED DESCRIPTION

Multi-stage dead reckoning for crowd sourcing is discussed herein. A device identifies signals it receives at a particular point in time, such as Wi-Fi signals and cell tower signals. The device records data indicating these identified signals, as well as data used to determine the position of the device at that particular point in time. The position of the device can be determined using dead reckoning, which is separated into two stages. In the first stage, a distance and direction of movement is determined at the device based on data from various inertial sensors of the device. In the second stage, various filters, maps, and/or other techniques are used at another device (e.g., a server), thus alleviating the first device of the burden of performing the second stage.

Figure 1:
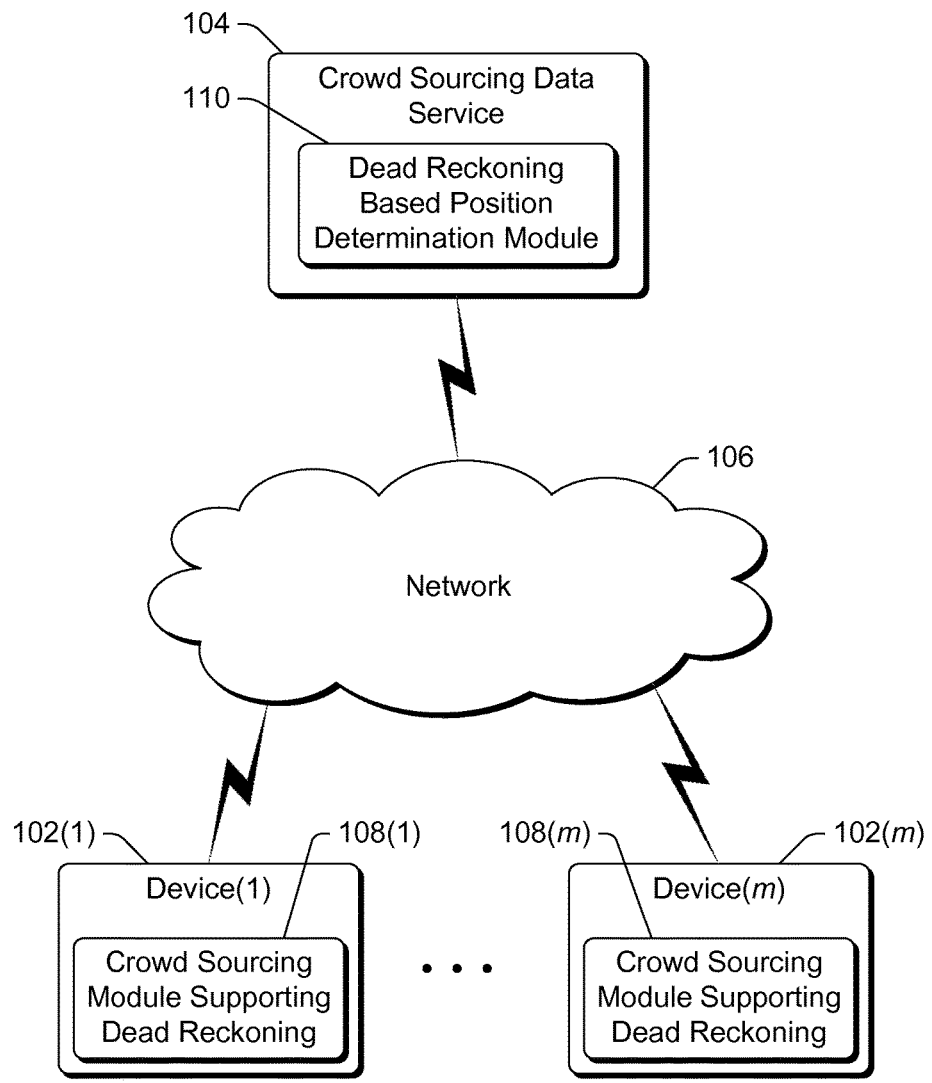
FIG. 1 illustrates an example system implementing the multi-stage dead reckoning for crowd sourcing in accordance with one or more embodiments.

FIG. 1 illustrates an example system 100 implementing the multi-stage dead reckoning for crowd sourcing in accordance with one or more embodiments. System 100 includes one or more (m) devices 102 that can communicate with a crowd sourcing data service 104 via a network 106. Network 106 can be a variety of different networks, including the Internet, a local area network (LAN), a wide area network (WAN), a telephone network, an intranet, other public and/or proprietary networks, combinations thereof, and so forth.

Each device 102 can be a variety of different types of devices, with different devices 102 being the same or different types of devices. Device 102 is typically a mobile device, the position of which is expected to change frequently over time. For example, device 102 can be a cellular or other wireless phone, a laptop or netbook computer, a tablet or notepad computer, a mobile station, an entertainment appliance, a game console, an automotive computer, and so forth. Thus, device 102 may range from a full resource device with substantial memory and processor resources (e.g., personal computers, game consoles) to a low-resource device with limited memory and/or processing resources (e.g., traditional set-top boxes, hand-held game consoles).

Device 102 records data identifying signals that device 102 receives and movement data indicating changes in position of device 102 at various points in time, as discussed in more detail below. Device 102 can also optionally provide various additional functionality, such as phone functionality, automotive computer functionality, gaming functionality, and so forth. Alternatively, device 102 can be a dedicated position sensing device that supports little, if any, functionality other than recording the data identifying received signals and movement data at various points in time.

Each device 102 includes a crowd sourcing module 108 that supports dead reckoning. Dead reckoning refers to determining a position of device 102 based on the movement of device 102 (e.g., as opposed to receiving one or more signals indicating the position of device 102). The dead reckoning is separated generally into two stages. In the first stage movement data indicating a distance moved and a direction of movement (e.g., a number of steps taken and the direction of those steps) is determined based on data from various inertial sensors of the device 102. In the second stage, various filters, maps, and/or other techniques are used to determine a position of the device 102 based on the movement data. Crowd sourcing module 108 implements the first stage of dead reckoning, and can optionally implement the second stage of dead reckoning as well, as discussed in more detail below. Although illustrated as a single module, it should be noted that the functionality of module 108 can alternatively be separated into multiple modules.

Crowd sourcing as used herein refers to each of multiple (typically a large number, such as hundreds of thousands or more) devices providing data to a service, so the service obtains data from a crowd of devices rather than relying on data from a single device. Both the individual devices and the service play a part in the crowd sourcing.

Crowd sourcing data service 104 includes a dead reckoning based position determination module 110 that receives data identifying signals that device 102 receives and movement data indicating changes in position of device 102 at various points in time. Module 110 determines positions of devices 102 based on the received movement data, and can implement the second stage of dead reckoning as discussed in more detail below. Alternatively, if the second stage of dead reckoning is performed on the devices 102, then dead reckoning based position determination module 110 receives data identifying signals that device 102 receives and the position of device 102 at various points in time. Crowd sourcing data service 104 collects these positions (whether determined by module 110 or received from a device 102) and the data identifying signals that device 102 receives at various points in time for subsequent use. The data collected by crowd sourcing data service 104 can be used to provide various location-based or position-based functionality. As used herein, a location refers to a general or larger geographic area rather than a precise coordinate, such as one or more buildings (e.g., home or work), a business or store, a buffer zone around a building, and so forth. A position, however, refers to a geographic area that is more precise than a location, such as a coordinate in some coordinate system (e.g., a particular latitude and/or longitude), a particular elevation, and so forth. Thus, each location can include multiple positions.

The data collected by crowd sourcing data service 104 can be used to provide various location-based or position-based functionality to other devices. For example, a device (such as a device 102) may be running a program that desires to know the position of the device, such as a mapping or navigation program. The device can send to crowd sourcing data service 104 an indication of signals the device receives, and service 104 can determine, based on the crowd sourcing data that indicates positions of other devices when those other devices received those same signals, the position of the device. This position can be returned to the device for use by the program running on the device.

Crowd sourcing data service 104 is implemented using one or more devices. The one or more devices used to implement crowd sourcing data service 104 can be a variety of different types of devices, such as server computers, desktop computers, any of the various types of devices discussed above with reference to device 102, and so forth. Service 104 can be implemented using multiple ones of the same and/or different types of devices.

In one or more embodiments, various data is recorded and/or provided to crowd sourcing data service 104, and the data is recorded and/or provided only after receiving user consent to do so. This user consent can be an opt-in consent, where the user takes an affirmative action to request that the data be recorded and/or provided before crowd sourcing module 108 performs any recording of data for the device or providing of data to service 104. Alternatively, this user consent can be an opt-out consent, where the user takes an affirmative action to request that the data not be recorded and/or provided; if the user does not choose to opt out of this recording and/or providing of data, then it is an implied consent by the user to record the data and provide the data to service 104.

Furthermore, it should be noted that the multi-stage dead reckoning for crowd sourcing techniques discussed herein can allow devices 102 to provide data to crowd sourcing data service 104, but need not include any personal information identifying particular users of devices 102 and/or particular devices 102. For example, a device 102 can record movement data and provide the movement data to service 104, but no association between the device 102 and the movement data need be provided to and/or maintained by service 104. Similarly, no association between the user of the device 102 and the movement data need be provided to and/or maintained by service 104.

Figure 2:
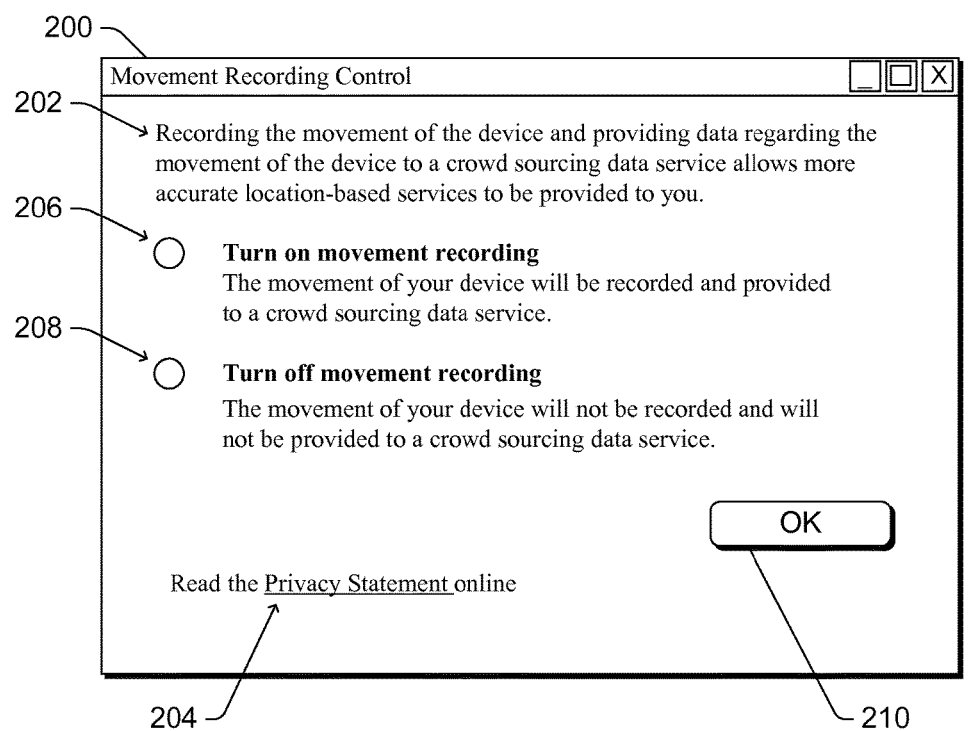
FIG. 2 illustrates an example user interface that can be displayed to a user of a device to allow the user to select whether data for that device will be recorded and/or provided to a crowd sourcing data service in accordance with one or more embodiments.

FIG. 2 illustrates an example user interface that can be displayed to a user of a device to allow the user to select whether data for that device will be recorded and/or provided to a crowd sourcing data service in accordance with one or more embodiments. A movement recording control window 200 is displayed including a description 202 explaining to the user why the movement of the device is being recorded. A link 204 to a privacy statement is also displayed. If the user selects link 204, a privacy statement is displayed, explaining to the user how the recorded movement data is kept confidential and/or how no association between the movement and the device (as well as the user of the device) is maintained.

Additionally, the user is able to select a radio button 206 to opt-in to the movement recording, or a radio button 208 to opt-out of the movement recording. Once a radio button 206 or 208 is selected, the user can select an "OK" button 210 to have the selection saved. It is to be appreciated that radio buttons and an "OK" button are only examples of user interfaces that can be presented to a user to opt-in or opt-out of the position recording, and that a variety of other conventional user interface techniques can alternatively be used. The device then proceeds to record or not record and/or provide the data in accordance with the user's selection.

Figure 3:
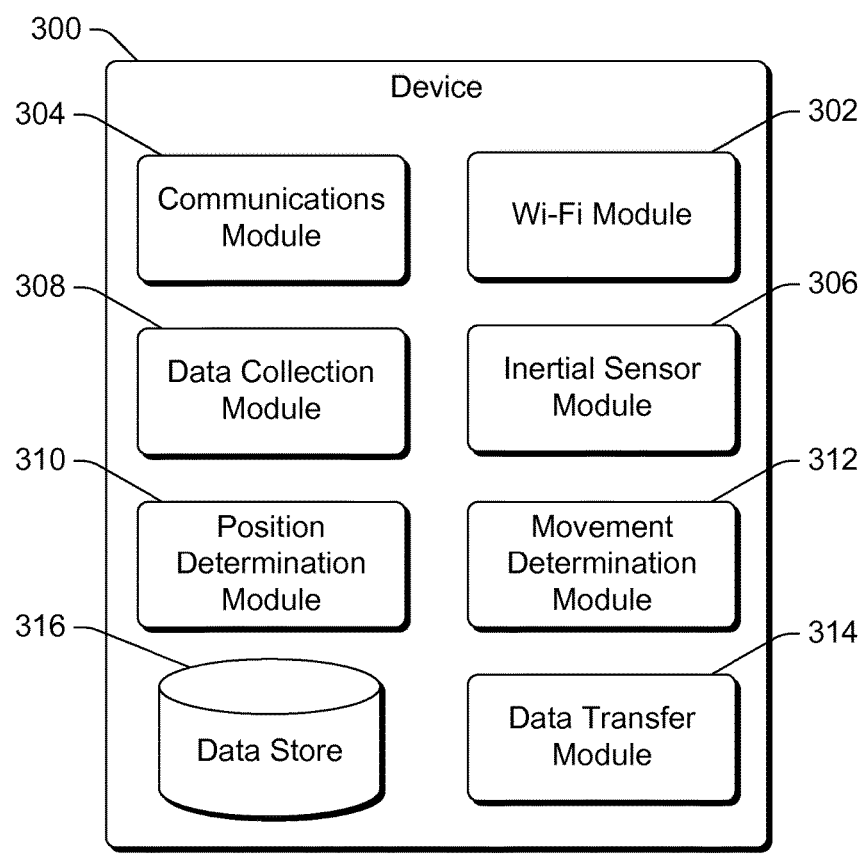
FIG. 3 illustrates an example device implementing the multi-stage dead reckoning for crowd sourcing in accordance with one or more embodiments.

FIG. 3 illustrates an example device 300 implementing the multi-stage dead reckoning for crowd sourcing in accordance with one or more embodiments. Device 300 can be, for example, a device 102 of FIG. 1. Device 300 includes a Wi-Fi module 302, a communications module 304, an inertial sensor module 306, a data collection module 308, a position determination module 310, a movement determination module 312, a data transfer module 314, and a data store 316. Modules 302-314 can implement, for example, crowd sourcing module 108 of FIG. 1. Each module 302-314 can be implemented in software, firmware, hardware, or combinations thereof. Although specific modules are illustrated in FIG. 3, it should be noted that additional modules can be included in device 300 and/or some modules (e.g., position determination module 310) illustrated need not be included in device 300. Additionally, it should be noted that the functionality of multiple modules illustrated in FIG. 3 can be combined into a single module, and/or the functionality of one or more modules illustrated in FIG. 3 can be separated into multiple modules.

Wi-Fi module 302 implements wireless functionality for device 300, sending signals to and/or receiving signals from devices on various wireless (but non-cellular) networks, allowing transferring of data to and/or from various services (e.g., crowd sourcing data service 104 of FIG. 1). Wi-Fi module 302 can receive signals from various wireless access points, including an identifier of a particular wireless access point and/or a particular wireless network from which a signal is received. For example, a wireless access point may send a media access control (MAC) address of the wireless access point, a basic service set identifier (BSSID) of a wireless network supported by the wireless access point, and so forth. Wi-Fi module 302 also optionally measures a strength (e.g., received signal strength indicator (RSSI) values) of these received radio signals. It should be noted that Wi-Fi module 302 can, at any given time for any given position of device 300, receive signals from multiple wireless access points. Wi-Fi module 302 provides or otherwise makes available an indication of the identifiers of the particular wireless access points and/or wireless networks from which signals are received, and optionally the strengths of those signals, to various other modules of device 300.

Wi-Fi module 302 can detect particular wireless access points and/or wireless networks from which signals are received, and the strength of those signals, at regular or irregular intervals. Wi-Fi module 302 can also detect particular wireless access points and/or wireless networks from which signals are received, and the strength of those signals, in response to various events, such as a request from another module of device 300.

Communications module 304 implements cell phone functionality for device 300, sending signals to and/or receiving signals from various cell transceivers (e.g., cell towers). Communications module 304 allows device 300 to access a cellular network, transferring data to and/or from various services (e.g., crowd sourcing data service 104 of FIG. 1). Communications module 304 can receive signals from various cell transceivers, including an identifier of a particular cell transceiver (e.g., a cell tower or transceiver identifier) from which a signal is received (e.g., a Global System for Mobile Communications (GSM) identifier or a code division multiple access (CDMA) identifier). Communications module 304 also optionally measures a strength (e.g., RSSI values) of these received signals. It should be noted that communications module 304 can, at any given time for any given position of device 300, receive signals from multiple cell transceivers. Communications module 304 provides or otherwise makes available an indication of the identifiers of the particular cell transceivers from which signals are received, and optionally the strengths of those signals, to various other modules of device 300.

Communications module 304 can detect particular cell transceivers from which signals are received, and the strength of those signals, at regular or irregular intervals. Communications module 304 can also detect particular cell transceivers from which signals are received, and the strength of those signals, in response to various events, such as a request from another module of device 300.

It should be noted that although device 300 is illustrated as including both Wi-Fi module 302 and communications module 304, device 300 need not include both modules 302 and 304. For example, device 300 may not use or support non-cellular wireless networks, in which case Wi-Fi module 302 need not be included in device 300. By way of another example, device 300 may not use or support cell phone functionality, in which case communications module 304 need not be included in device 300.

Inertial sensor module 306 includes one or more inertial sensors that detect movement (e.g., rotation, motion, velocity, etc.), altitude, and/or direction. These inertial sensors can be MEMS (Microelectromechanical Systems or Microelectronicmechanical systems). These inertial sensors can include, for example, an accelerometer, a compass, a gyroscope, a baroaltimeter, and so forth. Inertial sensor module 306 collects data regarding the detected movement, position, and/or direction of device 300 from these inertial sensors, and provides or otherwise makes available this collected data to other modules of device 300. This data can be used to determine a position of device 300 using dead reckoning, as discussed in more detail below.

It should also be noted that although inertial sensor module 306 is illustrated as being part of device 300, one or more inertial sensors can be implemented as a separate component or device that is coupled to device 300. For example, inertial sensors can be implemented as part of a watch worn by a user, as part of a device attached to a user's shoe, as part of a heart rate monitor component, and so forth.

Inertial sensor module 306 can collect data at regular or irregular intervals. Inertial sensor module 306 can also collect data in response to various events, such as a request from another module of device 300. In one or more embodiments, inertial sensor module 306 (including the inertial sensors) can also be deactivated or powered down at various times (e.g., to conserve energy), and not provide or collect data until module 306 is activated or powered on. Inertial sensor module 306 can be configured to deactivate or power down itself in response to certain conditions (e.g., after a threshold amount of time), and/or in response to a deactivate or power down signal from another module of device 300. Inertial sensor module 306 (including the inertial sensors) can be activated or powered on in response to a signal from another module of device 300 and/or in response to certain conditions (e.g., being deactivated or powered down for a threshold amount of time).

Movement determination module 312 performs a first stage of dead reckoning based on data collected by inertial sensor module 306. The first stage of dead reckoning produces a result that is movement data, which indicates a distance and direction that device 300 has moved in a particular time interval. This distance can be identified in different manners, such as a number of steps taken by a user with device 300, a number of feet or meters moved, and so forth. This direction can also be identified in different manners, such as a compass direction, a change in direction (e.g., in degrees based on a 360-degree range of motion) since the last step taken, and so forth. This movement data can also optionally include elevation changes, such as a change in altitude of device 300. The movement data can include multiple distances and directions for device 300, such as device 300 having first moved in one direction for a particular distance, then moved in another direction for another particular distance, and so forth.

In one or more embodiments, movement determination module 312 generates movement data indicating a number of steps taken by the user of device 300, as well as the length and direction of each step. This movement data can be determined, based on the data from inertial sensor module 306, using a variety of different publicly available and/or proprietary techniques. For example, a direction of a step can be determined based on data from a compass, the data from the compass indicating the direction of movement at the time a step is made. A number of steps can be determined based on data from an accelerometer, such as peaks in the data from the accelerometer indicating that a step has been taken. A length of a step can be determined based on data from an accelerometer, such as a time between peaks in the data from the accelerometer indicating a speed at which the user is moving as well as a length of the steps of the user. The length of a step could be based on a typical or average step length of the user or a group of users (e.g., based on the speed at which the user is moving), or alternatively could be calculated based on the data from inertial sensor module 306 (e.g., based on the peak to peak acceleration data and time length delta for a step identified from the data from an accelerometer).

Data collection module 308 implements functionality to record data identifying signals that device 300 receives and corresponding movement data for device 300 at various points in time. Wi-Fi module 302 provides or otherwise makes available an indication of the identifiers of the particular wireless access point and/or wireless network from which signals are received, and optionally the strengths of those signals, as discussed above. Communications module 304 provides or otherwise makes available an indication of the identifiers of the particular cell transceivers from which signals are received, and optionally the strengths of those signals, as discussed above. The indication of the identifiers of the particular wireless access point and/or wireless network from which signals are received at a particular point in time (and optionally the strengths of those signals) and/or the indication of the identifiers of the particular cell transceivers from which signals are received at that particular point in time (and optionally the strengths of those signals) is also referred to as observation data at that particular point in time. Various additional information can be included as part of the observation data, such as a date and/or time of the particular point in time, data identifying a type (e.g., model and/or version) of device 300 and/or software (e.g., an operating system) or other instructions running or installed on device 300, and so forth. Data collection module 308 records, in data store 316, the observation data at that particular point in time. Movement data determined by movement determination module 312 at that particular point in time is also recorded in data store 316 and corresponds to the observation data.

It should be noted that, although the observation data is discussed with reference to being identifiers of the particular wireless access point, wireless network, and/or cell transceivers from which signals are received at a particular point in time (and optionally the strengths of those signals), the observation data can also (or alternatively) include identifiers of other signals. For example, the observation data can include identifiers of signals (and optionally the strengths of such signals) received from other beacons or transmitters, such as Bluetooth Low Energy (BLE) transmitters, radio frequency transmitters, Near Field Communication (NFC) transmitters, and so forth. A module of device 300 (e.g., module 302, module 304, or another module not illustrated) can receive identifiers of such signals and provide or otherwise make available an indication of the identifiers of such signals, as well as the strengths of those signals, to various other modules of device 300.

Data collection module 308 stores a record including the observation data and corresponding movement data at different points in time. These different points in time can be at regular intervals, irregular intervals, or can be determined based on other factors or events. For example, a point in time can be each point at which a user of device 300 takes a step. Over time, data collection module 308 stores multiple such records in data store 316.

Data transfer module 314 sends the recorded observation data and corresponding movement data to a data service (e.g., crowd sourcing data service 104 of FIG. 1). Data transfer module 314 can send the recorded observation data and movement data to the data service at regular or irregular intervals, or alternatively in response to other events (e.g., device 300 being connected to or logged into a particular network, device 300 being connected to a particular type of network (e.g., a wireless network via Wi-Fi), etc.).

The record of movement data can take various forms. In one or more embodiments, for each step taken by the user of device 300 the movement data is included in a record having: a timestamp, a number of steps moved, a length of the most recent step, and a direction of the most recent step. The timestamp indicates a time (and optionally date) when the movement was made (when the data from which the movement data is determined is collected from one or more inertial sensors). The number of steps moved indicates how many steps the user of device 300 has taken since the movement data for the current dead reckoning began being collected. The number of steps moved is reset (e.g., to zero) each time dead reckoning begins. The length of the most recent step indicates the distance moved (e.g., a particular number of centimeters or feet) in the most recent step taken by the user. The direction of the most recent step indicates a compass direction of the most recent step or change in direction (e.g., in degrees based on a 360-degree range of motion) between the most recent step and the step previous to the most recent step. For each such record of movement data, corresponding observation data can be obtained.

In other embodiments, a linear run of a user of device 300 is determined (e.g., by data collection module 308 and/or movement determination module 312), and the record of movement data includes data for each linear run. A linear run refers to movement of any number of steps by a user of device 300 in approximately the same direction (e.g., with the change in direction between steps or since a first step in the linear run being less than a threshold amount). In such embodiments, the movement data is included in a record having: a timestamp, a distance moved in the linear run, and a direction of motion. The timestamp indicates a time (and optionally date) when the movement of the linear run was made (when the data from which the movement data for the linear run is determined began and/or stopped being collected from one or more inertial sensors). The distance moved in the linear run indicates the distance moved (e.g., a particular number of centimeters or feet) in the linear run. The direction of the most recent step indicates a compass direction of the linear run or change in direction (e.g., in degrees based on a 360-degree range of motion) between the linear run and a previous linear run.

In situations in which a record of movement data includes data for a linear run, each such record can have one or more corresponding observation data. For example, observation data can be obtained at multiple different points in time during the linear run. Each of these different observation data correspond to the linear run, and can be associated with a particular position in the linear run in different manners. For example, assume that a linear run extends 10 feet and that observation data is obtained at the beginning of the linear run, at the end of the linear run, and at one point during the linear run. The observation data obtained at the beginning of the linear run corresponds to the time or position at the beginning of the linear run, the observation data obtained at the end of the linear run corresponds to the time or position at the end of the linear run, and the observation data obtained during the linear run corresponds to a time or position at a point during the linear run. This point during the linear run can be determined in different manners. For example, the point during the linear run can be determined linearly based on distance, so that if the linear run is 10 feet then the point during the linear run is at the 5-foot point in the linear run. By way of another example, the point during the linear run can be determined linearly based on times (e.g., if the linear run is 10 feet and is 3 seconds from beginning to end, and the point during the run is obtained at 1 second into the linear run, then the point during the run can be estimated as at the 3.33-foot point in the linear run).

It should be noted, however, that these are examples of records of movement data, and that the record of movement data can take various other forms.

Data transfer module 314 sends the recorded observation data and corresponding movement data to a data service as indicated above. The movement data, in conjunction with a known starting position for the dead reckoning, can be used by the data service to obtain a position of device 300 corresponding to the recorded observation data. The known starting position can be determined by data collection module 308, movement determination module 312, or alternatively another module of device 300. The known starting position can be determined in different manners, such as by a Global Navigation Satellite System (GNSS) module, based on a position identified by a short range beacon (e.g., transmitting positions in different manners, such as using Bluetooth transmitters, BLE transmitters, radio frequency transmitters, NFC transmitters, and so forth), based on a position specified by a user of device 300 (e.g., by providing a user input of the position on a map), and so forth.

It should be noted that data transfer module 314 need not send data to the data service that includes any personal information identifying a particular user of device 300 and/or a particular device 300. Thus, although movement data for device 300 is sent to the data service, the data service need have no indication of which device and/or user that movement data is for. Furthermore, the data sent to the data service by data transfer module 314 can optionally be encrypted using various conventional encryption techniques, allowing the data to be decrypted by the data service but not by other services or devices.

Data transfer module 314 can also optionally compress data sent to the data service. Any of a variety of public and/or proprietary compression algorithms can be used to compress the data sent to the data service. For example, data transfer module 314 can use run-length encoding, LZW (Lempel-Ziv-Welch) compression, and so forth.

One or more modules of the data service (e.g., dead reckoning based position determination module 110 of FIG. 1) implement the second stage of dead reckoning. In the second stage, the data service uses various filters, maps, and/or other techniques to determine a position of the device 300 based on the movement data. The inertial sensors from which the movement data is determined oftentimes introduce error into the movement data over time, which is also referred to as drift, and the second stage of dead reckoning attempts to correct this error. The determined position associated with the movement data (and thus also the observation data) can be used to provide various location-based or position-based functionality. Thus, device 300 is alleviated of the burden of performing the second stage of dead reckoning, and can conserve energy by not performing the second stage of dead reckoning.

The data service can use a variety of conventional, public, and/or proprietary techniques to determine a position of the device 300 based on the movement data. For example, the known starting position can correspond to a map available to the data service (e.g., a map of the interior of a building or other area in which GNSS signals are not received by device 300), and this map can be used to determine a position of device 300 based on movement data. E.g., the data service can filter the movement data so that it corresponds to open areas or hallways, to reflect the fact that the user of device 300 is moving in an open area or hallway rather than through a wall. By way of another example, various conventional filters can be used to determine the position of device 300 based on the movement data, such as Kalman filters, particle filters, Bayesian estimation, and so forth.

It should be noted that the position of device 300 as determined by the data service using dead reckoning need not be returned to device 300. The position can be returned to device 300 if device 300 is running an application that desires, or some other module desires, the position of device 300 (e.g., a mapping or navigation application). However, as part of performing the dead reckoning the position of device 300 need not be returned to device 300 from the data service.

It should also be noted that the timing of when data transfer module 314 sends the data to the data service can vary based on a type of network that device 300 can communicate with at particular times, as well as the particular application being serviced through the determination of device position. Different networks can have different costs associated with transmitting data. For example, a cellular network accessed by communications module 304 may be more costly (e.g., in terms of a monetary cost or other fee associated with transferring data over the network) than a Wi-Fi wireless network accessed by Wi-Fi module 302. Accordingly, data transfer module 314 can wait to send data to the data service until device 300 can communicate with a network having a low cost (e.g., a cost or fee below a threshold amount), such as a Wi-Fi wireless network accessed by Wi-Fi module 302.

Device 300 optionally includes position determination module 310. Situations can arise in which an application or other module on device 300 desires the position of device 300 in near real-time (e.g., a mapping or navigation application). In such situations, position determination module 310 can determine the position of device 300 rather than sending the movement data and observation data to the data service and having the data service determine the position of device 300. Position determination module 310 can determine the position of device 300 in the same manner as the data service would determine the position of device 300 based on movement data as discussed above. Data transfer module 314 can communicate the determined position of device 300 and corresponding observation data to the data service, which can maintain the position and corresponding observation data as if the data service itself had determined the position.

Whether the second stage of dead reckoning is performed on device 300 or by a data service (e.g., crowd sourcing data service 104 of FIG. 1) can be determined by a module of device 300 (e.g., movement determination module 312 and/or position determination module 310), or alternatively by another device or service that provides an indication of the determination to device 300. Whether the second stage of dead reckoning is performed on device 300 or by a data service can be determined based on various criteria. Which criteria are used, and how those criteria are used, can vary by implementation. For example, a module making the determination of whether the second stage of dead reckoning is performed on device 300 or by a data service can be pre-configured with the criteria to use and/or how to use the criteria, can receive a user input from a user of device 300 indicating which criteria to use and/or how to use the criteria, and so forth.

In one or more embodiments, the criteria include power consumption at device 300, an amount of data transferred from device 300 to the data service, and/or an amount of time taken in transferring data between device 300 and the data service. One or more of these criteria can be used to determine whether the second stage of dead reckoning is performed on device 300 or by a data service.

The power consumption at device 300 refers to the amount of power that would be consumed by various components of device 300 in performing the second stage of dead reckoning and/or transferring the observation data and movement data to the data service. These components typically include one or more processors of device 300 that would be used to perform the second stage of dead reckoning and/or network components of device 300 that would be used to transfer the observation data and movement data to the data service, but can also include other components.

The amount of data transferred from device 300 to the data service refers to an amount of data (e.g., a number of bytes or kilobytes) that would be transferred to the data service as the observation data and movement data. Different networks (e.g., a cellular network accessed by communications module 304, a Wi-Fi wireless network accessed by Wi-Fi module 302, etc.) can have different costs associated with transmitting data, and this cost along with the amount of data to be transferred can be used in determining whether the second stage of dead reckoning is performed at device 300 or the data service.

The amount of time taken in transferring data between device 300 and the data service refers to the amount of time taken to transfer the observation data and movement data to the data service, have the data service determine a position based on the second stage of dead reckoning, and return an indication of the position to device 300. If a module of or application running on device 300 desires an indication of the position of device 300, then whether the second stage of dead reckoning is performed on device 300 can be determined based on whether the position could be determined by the data service and returned quickly enough (e.g., within a threshold amount of time) for the application or module that desires the indication of the position.

These criteria can be used in various manners to determine whether the second stage of dead reckoning is performed at device 300 or a data service. The use of the various criteria, as well as the ability to perform the second stage of dead reckoning at the device 300 or at the data service, allows various usage scenarios taking into account various different factors. For example, if the power consumed by a processor of device 300 in performing the second stage of dead reckoning is greater than the power consumed by a network component of device 300 in transferring the observation data and movement data to the data service, then the determination can be made to perform the second stage of dead reckoning at the data service. By way of another example, if device 300 can currently communicate with the data service via a cellular network but not via a Wi-Fi wireless network, then the determination can be made to perform the second stage of dead reckoning at the data service, but to wait until device 300 can communicate with the data service via a Wi-Fi wireless network to transfer the observation and movement data to the data service. By way of yet another example, if the position can be determined by the data service and returned within a threshold amount of time, then the determination is made that the second stage of dead reckoning is performed by the data service; however, if the position cannot be determined by the data service and returned within a threshold amount of time, then the determination is made that the second stage of dead reckoning is performed by device 300.

It should be noted that device 300 can also include various additional modules to assist in crowd sourcing. In one or more embodiments, device 300 includes a GNSS module that implements GNSS functionality for device 300, determining a position of device 300 based on one or more satellites from which the GNSS module can receive signals or otherwise communicate. This determined position is typically latitude and longitude coordinates, although the position can alternatively be specified in other manners. The GNSS module can implement the GNSS functionality using a variety of different technologies, such as the Global Positioning System (GPS), the Global Navigation Satellite System (GLONASS), the BeiDou (or Compass) navigation system, the Galileo positioning system, combinations thereof, and so forth. The GNSS module provides or otherwise makes available the determined position of device 300 to various other modules of device 300, allowing this position to be used in place of or in addition to positions determined based on dead reckoning.

It should also be noted that inertial sensor module 306 and the inertial sensors from which data is collected by module 306 can be deactivated or powered down when determining movement data is not desired. For example, in situations in which the position of device 300 is determined in manners other than dead reckoning (e.g., such as by using a GNSS module), module 306 and the inertial sensors need not be activated or powered on. When deactivated or powered down, inertial sensors and module 306 consume very little if any energy. Thus, by keeping inertial sensor module 306 deactivated or powered down until determining movement data for dead reckoning is desired, the energy usage of device 300 can be reduced. However, inertial module 306 and the inertial sensors can then be activated or powered on to provide data used to determine the movement data when determining movement data for dead reckoning is desired.

Additionally, although the multi-stage dead reckoning for crowd sourcing techniques are discussed herein with reference to two stages, it should be noted that the dead reckoning can have any number of stages. For example, the second stage could be separated into multiple stages, with one or more of these multiple stages being performed on device 300, and one or more of these multiple stages being performed by a data service (e.g., crowd sourcing data service 104 of FIG. 1).

Furthermore, in the discussions above, the dead reckoning is discussed with reference to a user taking steps (e.g., walking) with device 300. However, it should be noted that the multi-stage dead reckoning for crowd sourcing techniques discussed herein can be used with other movements. For example, device 300 can be part of or located in a moving vehicle. In such situations, in the first stage movement data can indicate a distance moved and direction of movement in different manners, such as: a number of feet or meters moved and the direction of that movement; a speed of movement and duration of the movement at that speed, as well as the direction of that movement; and so forth. In the second stage, various filters, maps, and/or other techniques are used to determine a position of the device 102 based on the movement data, although the movement data is for movement of a vehicle rather than steps taken by a user.

Figure 4:
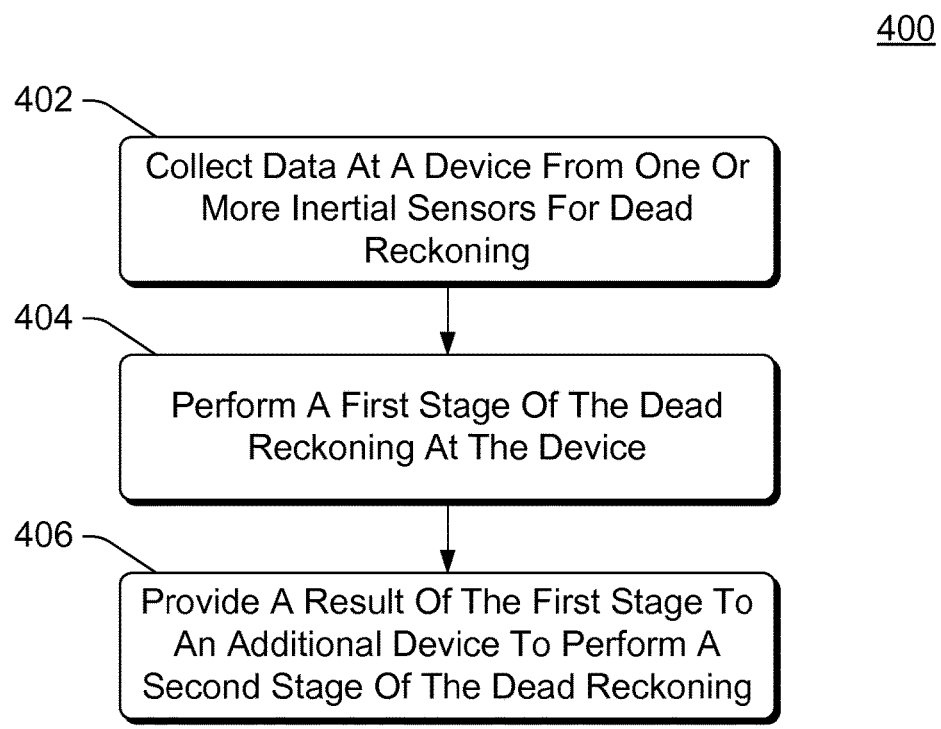
FIG. 4 is a flowchart illustrating an example process for implementing the multi-stage dead reckoning for crowd sourcing in accordance with one or more embodiments.

FIG. 4 is a flowchart illustrating an example process 400 for implementing the multi-stage dead reckoning for crowd sourcing in accordance with one or more embodiments. Process 400 is carried out by a device, such as device 102 of FIG. 1 or device 300 of FIG. 3, and can be implemented in software, firmware, hardware, or combinations thereof. Process 400 is shown as a set of acts and is not limited to the order shown for performing the operations of the various acts. Process 400 is an example process for implementing the multi-stage dead reckoning for crowd sourcing; additional discussions of implementing the multi-stage dead reckoning for crowd sourcing are included herein with reference to different figures.

In process 400, data from one or more inertial sensors is collected to determine a position of the device using dead reckoning (act 402). Data can be collected from various inertial sensors as discussed above.

A first stage of the dead reckoning is performed at the device (act 404). The first stage determines a distance moved and direction of movement of the device as discussed above.

A result of the first stage (the determined distance and direction of movement) is provided to an additional device (act 406). Additional data, such as observation data, is also provided to the additional device as discussed above. The additional device is a device of a crowd sourcing data service as discussed above. In the second stage, various filters, maps, and/or other techniques are used to determine the position of the device, as discussed above. In certain situations the second stage can be performed by the device implementing process 400 as discussed above, in which case the result of the first stage need not be provided to the additional device.

Figure 5:
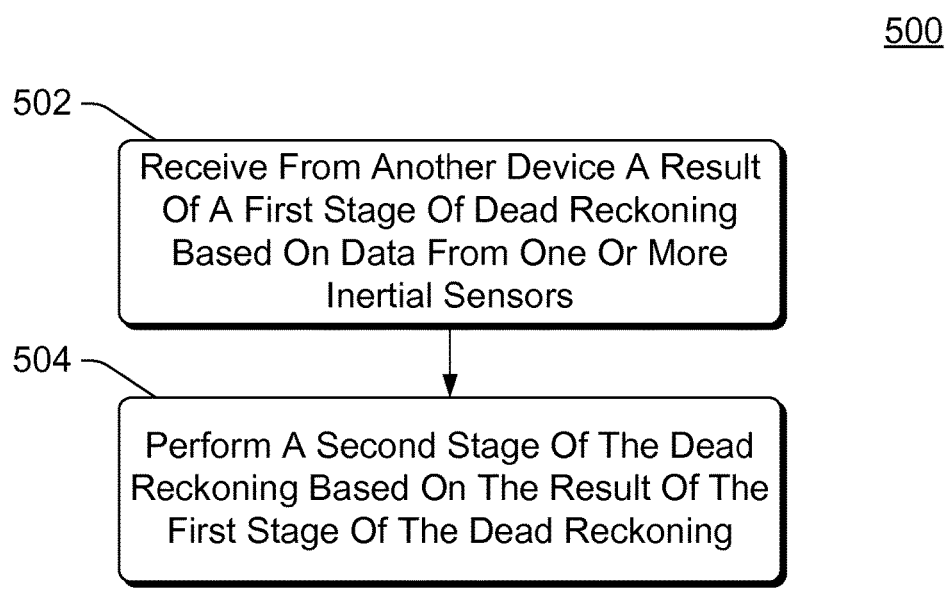
FIG. 5 is a flowchart illustrating an example process for implementing the multi-stage dead reckoning for crowd sourcing in accordance with one or more embodiments.

FIG. 5 is a flowchart illustrating an example process 500 for implementing the multi-stage dead reckoning for crowd sourcing in accordance with one or more embodiments. Process 500 is carried out by a device of a data service, such as a device implementing at least part of crowd sourcing data service 104 of FIG. 1, and can be implemented in software, firmware, hardware, or combinations thereof. Process 500 is shown as a set of acts and is not limited to the order shown for performing the operations of the various acts. Process 500 is an example process for implementing the multi-stage dead reckoning for crowd sourcing; additional discussions of implementing the multi-stage dead reckoning for crowd sourcing are included herein with reference to different figures.

In process 500, a result from a first stage of data reckoning based on data from one or more inertial sensors is received from another device (act 502). The result from the first stage of dead reckoning refers to a distance and direction of movement determined by the other device as discussed above.

A second stage of the dead reckoning is performed based on the result of the first stage (act 504). In the second stage, various filters, maps, and/or other techniques are used to determine the position of the device, as discussed above.

Various actions such as communicating, receiving, sending, recording, storing, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
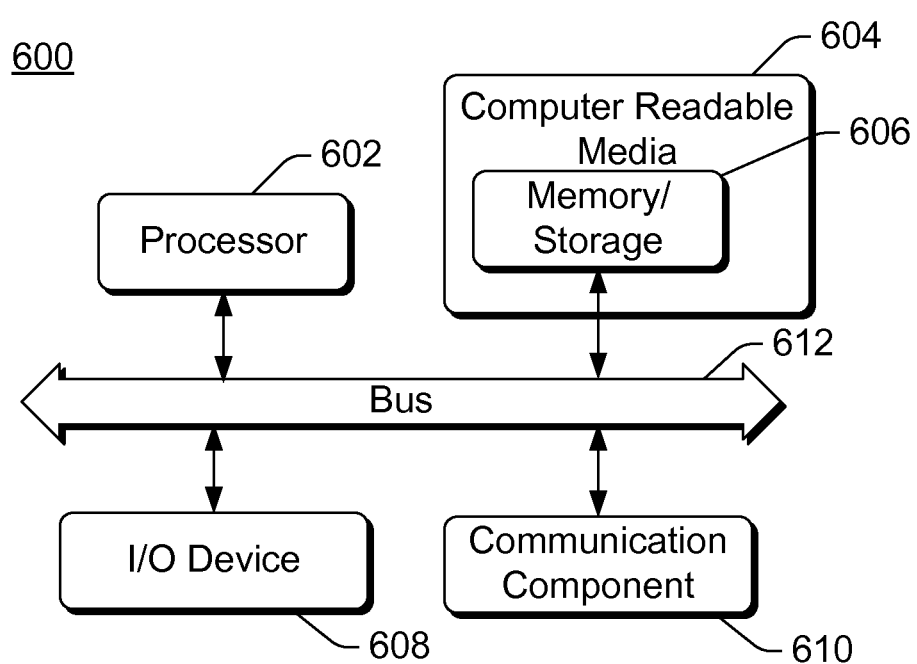
FIG. 6 illustrates an example computing device that can be configured to implement the multi-stage dead reckoning for crowd sourcing in accordance with one or more embodiments.

FIG. 6 illustrates an example computing device 600 that can be configured to implement the multi-stage dead reckoning for crowd sourcing in accordance with one or more embodiments. Computing device 600 can, for example, be a computing device 102 of FIG. 1, implement at least part of crowd sourcing data service 104 of FIG. 1, be a device 300 of FIG. 3, and so forth.

Computing device 600 includes one or more processors or processing units 602, one or more computer readable media 604 which can include one or more memory and/or storage components 606, one or more input/output (I/O) devices 608, one or more communication components 610, and a bus 612 that allows the various components and devices to communicate with one another. Computer readable media 604, one or more I/O devices 608, and/or one or more communication components 610 can be included as part of, or alternatively may be coupled to, computing device 600. Processor 602, computer readable media 604, one or more of devices 608, one or more communication components 610, and/or bus 612 can optionally be implemented as a single component or chip (e.g., a system on a chip). Bus 612 represents one or more of several types of bus structures, including a memory bus or memory controller, a peripheral bus, an accelerated graphics port, a processor or local bus, and so forth using a variety of different bus architectures. Bus 612 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that where instructions are stored in computing device 600 can change over time.

One or more input/output devices 608 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, and so forth.

One or more communication components 610 allow data and/or instructions to be communicated to and/or from computing device 600. A communication component 610 can send and/or receive signals in various manners, such as via a cellular network, via a Wi-Fi network, via a wired network, via another wired and/or wireless connection, and so forth. A component 610 allows, for example, a result of a first stage to be transmitted or received by computing device 600.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of communication media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the multi-stage dead reckoning for crowd sourcing techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device comprising:
    an accelerometer configured to provide accelerometer data reflecting movement of the mobile device;
    a processing device; and
    a storage device storing computer-executable instructions which, when executed by the processing device, cause the processing device to:
    collect the accelerometer data from the accelerometer; and
    determine a position of the mobile device cooperatively with a remote server by:
        performing a first stage of dead reckoning locally on the mobile device, the first stage of dead reckoning comprising:
            evaluating the accelerometer data to detect linear runs when a user of the mobile device takes multiple steps without changing direction more than a specified amount; and
            creating respective movement records for the linear runs, the respective movement records including respective movement distances and movement directions for the linear runs;
        sending the respective movement records for the linear runs from the mobile device to the remote server, the remote server performing a second stage of dead reckoning using the respective movement records to obtain a position of the mobile device; and
        receiving, from the remote server, the position of the mobile device as determined by the remote server.

2. The mobile device as recited in claim 1, wherein the computer-executable instructions further cause the processing device to:
    detect individual steps taken by the user by identifying peaks in the accelerometer data.

3. The mobile device as recited in claim 2, wherein the computer-executable instructions further cause the processing device to:
    determine respective lengths of the individual steps based at least on respective times between the peaks in the accelerometer data.

4. The mobile device as recited in claim 1, wherein the computer-executable instructions further cause the processing device to:
    send a known starting position of the mobile device from the mobile device to the remote server for use in the second stage of dead reckoning.

5. The mobile device as recited in claim 4, wherein the computer-executable instructions further cause the processing device to:
    determine the known starting position based at least on information received from a beacon.

6. The mobile device as recited in claim 4, further comprising a global navigation satellite system module configured to determine the known starting position.

7. The mobile device as recited in claim 1, wherein the computer-executable instructions further cause the processing device to:
    determine respective direction changes between individual steps taken by the user;
    compare the respective direction changes to a threshold; and
    for a group of steps having respective direction changes below the threshold, designate the group of steps as an individual linear run.

8. The mobile device as recited in claim 1, wherein the computer-executable instructions further cause the processing device to:
    determine an amount of power that would be consumed by one or more components of the mobile device in performing the second stage of dead reckoning;
    based at least on the determined amount of power, determine whether to perform the second stage of dead reckoning locally on the mobile device or to send the respective movement records to the remote server; and
    in at least one instance, use the respective movement records for the linear runs to perform the second stage of dead reckoning locally at the mobile device instead of sending the respective movement records to the remote server.

9. The mobile device as recited in claim 8, wherein, in the at least one instance, the determined amount of power to be consumed by the one or more components of the mobile device is less than another amount of power that would be consumed by transferring the respective movement records to the remote server.

10. A mobile device, comprising:
one or more inertial sensors configured to provide inertial sensor data reflecting movement of the mobile device;
a processing device; and
a storage device storing computer-executable instructions which, when executed by the processing device, cause the processing device to:
collect the inertial sensor data from the one or more inertial sensors; and
determine a position of the mobile device by:
performing a first stage of dead reckoning locally on the mobile device using the inertial sensor data obtained from the one or more inertial sensors, the first stage of dead reckoning comprising:
evaluating the inertial sensor data to detect linear runs when a user of the mobile device takes multiple steps without changing direction more than a specified amount; and
creating respective movement records for the linear runs, the respective movement records including respective distances and movement directions for the linear runs;
making a determination, based at least on an amount of data in the respective movement records, whether to perform a second stage of dead reckoning locally on the mobile device or send the respective movement records to a second device; and
in at least one instance, based at least on the determination:
sending the respective movement records from the mobile device to the second device, the second device performing the second stage of dead reckoning based at least on the respective movement records, the second stage of dead reckoning resulting in the position of the mobile device, and
receiving, from the second device, the position of the mobile device as determined remotely by the second device.

11. The mobile device as recited in claim 10, wherein the computer-executable instructions further cause the processing device to:
in at least one other instance, determine the position of the mobile device by performing the second stage of dead reckoning locally at the mobile device.

12. A method for determining a position of a mobile device, the method comprising:
collecting accelerometer data from an accelerometer of the mobile device, the accelerometer data reflecting movement of the mobile device;
performing, by the mobile device, a first stage of dead reckoning using the accelerometer data collected from the accelerometer of the mobile device, the first stage of dead reckoning comprising:
evaluating the accelerometer data to detect linear runs when a user of the mobile device takes multiple steps without changing direction more than a specified amount; and
creating respective movement records for the linear runs, the respective movement records including respective movement distances and movement directions for the linear runs;
in at least one instance, sending the respective movement records for the linear runs from the mobile device to a remote second device that performs a second stage of dead reckoning based at least on the respective movement records, the second stage of dead reckoning resulting in the position of the mobile device; and
receiving, at the mobile device from the remote second device, the position of the mobile device as determined by the remote second device.

13. The method as recited in claim 12, further comprising:
recording crowd sourcing data as the respective movement records are created.

14. The method as recited in claim 13, further comprising:
sending the crowd sourcing data from the mobile device to the remote second device, the crowd sourcing data including an indication of identifiers of wireless access points or cell transceivers from which signals are received by the mobile device when the respective movement records are created.

15. The method as recited in claim 12, further comprising:
checking whether the mobile device can communicate with a network having a cost or fee below a threshold amount; and
in the at least one instance, sending the respective movement records via the network to the remote second device.

16. The method as recited in claim 12, further comprising:
checking whether the mobile device can communicate with a network having a cost or fee below a threshold amount; and
in another instance, delaying sending the respective movement records to the remote second device until the mobile device can communicate with the network having the cost or the fee below the threshold amount.

17. The method as recited in claim 12, further comprising:
detecting when the user takes multiple steps in a particular direction without varying from the particular direction more than a threshold amount; and
grouping the multiple steps together into an individual linear run.

18. The method as recited in claim 17, further comprising:
determining the particular direction using a compass of the mobile device.

19. The method as recited in claim 12, wherein evaluating the accelerometer data to detect the linear runs comprises:
identifying peaks in the accelerometer data indicating that steps have been taken by the user;
using a compass of the mobile device to determine respective directions of each of the steps;
comparing deviations in direction between consecutive steps to a threshold; and
designating, as an individual linear run, a group of multiple consecutive steps for which the deviations in direction fall below the threshold.

20. The method as recited in claim 19, further comprising:
receiving crowd sourcing data, at the remote second device, from the mobile device and from additional devices, the crowd sourcing data identifying wireless access points or cell transceivers and respective signal strengths as detected by the mobile device and the additional devices at various locations; and
using the crowd sourcing data to determine locations of other devices that are in proximity to the wireless access points or cell transceivers.

* * * * *